(12) United States Patent
Chung

(10) Patent No.: US 7,158,576 B2
(45) Date of Patent: Jan. 2, 2007

(54) ORTHOGONALLY-MULTIPLEXED ORTHOGONAL AMPLITUDE MODULATION METHOD

(75) Inventor: Char-Dir Chung, Taoyuan Hsien (TW)

(73) Assignee: Accton Technology Corporation, Hsinchu (TW)

(*) Notice: Subject to any disclaimer, the term of this patent is extended or adjusted under 35 U.S.C. 154(b) by 831 days.

(21) Appl. No.: 10/336,016

(22) Filed: Jan. 3, 2003

(65) Prior Publication Data
US 2004/0131126 A1     Jul. 8, 2004

(51) Int. Cl.
H04L 27/00 (2006.01)

(52) U.S. Cl. .............. 375/259; 375/268; 375/300; 370/203; 370/533

(58) Field of Classification Search .......... 375/268, 375/271, 300, 259, 295, 353; 370/208, 480, 370/533, 539, 916, 203, 464, 538
See application file for complete search history.

(56) References Cited

U.S. PATENT DOCUMENTS 6,400,781 B1* 6/2002 Vandendorpe et al. ...... 375/350
6,628,738 B1* 9/2003 Peeters et al. .............. 375/371

OTHER PUBLICATIONS

Reed et al., 'N-Orthogonal Phase-Modulated Codes', IEEE, Transactions on Information Theory, vol. IT-12, No. 3, pp. # 388-395.*
Chang, 'Synthesis of Band-Limited Orthogonal Signals for Multichannel Data Transmission', Dec. 1996, The Bell System Technical Journal, pp. # 1775-1796.*
Chang, "Synthesis of Band-limited Orthogonal Signals for Multichannel Data Transmission," The Bell System Technical Journal, Dec. 1966, pp. 1775-1796.
Chung, "Differential Detection of Quadrature Frequency/Phase Modulated Signals," IEEE Transactions on Communications, vol. 47, No. 4, Apr. 1999, pp. 546-557.
Fleisher et al., "Quadrature Frequency/Phase Modulation," IEEE Transactions on Communications, vol. 43, No. 2/3/4, Feb./Mar./Apr. 1995, pp. 1513-1524.
Reed et al., "N-Orthogonal Phase-Modulated Codes," IEE Transactions on Information Theory, vol. IT-12, No. 3, pp. 388-395.
Saha et al., "Quadrature-Quadrature Phase-Shift Keying ," IEEE Transactions on Communications, vol. 37. No. 5, May 1989, pp. 437-448.

* cited by examiner

Primary Examiner—Pankaj Kumar
Assistant Examiner—Naheed Ejaz
(74) Attorney, Agent, or Firm—Birch, Stewart, Kolasch & Birch, LLP

(57) ABSTRACT

An orthogonally-multiplexed orthogonally-amplitude-modulated (OMOAM) method is disclosed. The OMOAM signal is constituted by orthogonally multiplexing M component signals, each constructed by a data-chosen group of L orthogonal pulse-amplitude-modulated basis signals. A generalized signal model is proposed to characterize the OMOAM signal in a unified way such that the generalized signal model contains a multitude of new modulations. A generalized optimum receiver for coherently demodulating OMOAM signals is developed and analyzed in terms of the bit error probability for the additive white Gaussian noise channel. The spectral characteristics of the OMOAM signals constructed from various time-limited and band-limited basis sets are studied in terms of the fractional out-of-band power containment. Several general trends of error and spectral performance characteristics are exploited.

19 Claims, 12 Drawing Sheets

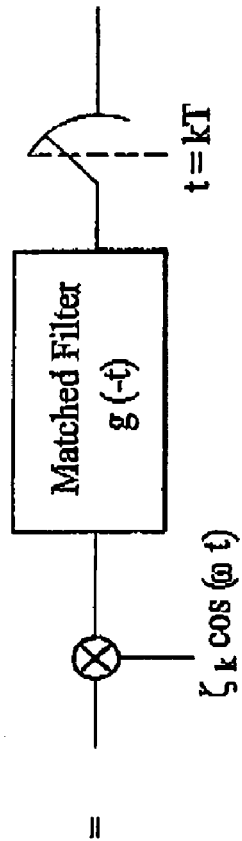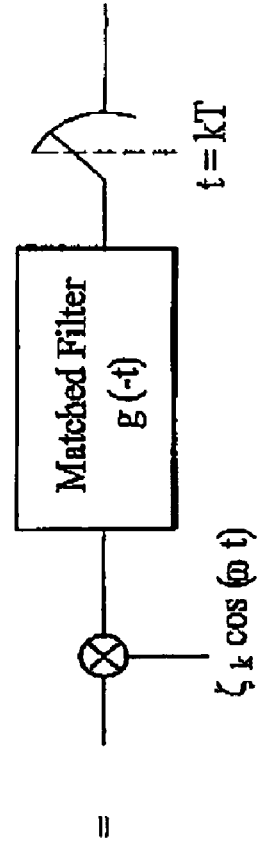
FIG. 2b
FIG. 2c

| L | K | $\gamma_b$ (in dB) | | | | | | | |
|---|---|---|---|---|---|---|---|---|---|
| | | $N_c=1$ | $N_c=2$ | $N_c=4$ | $N_c=8$ | $N_c=16$ | $N_c=32$ | $N_c=64$ | $N_c=128$ |
| 1 | 2 (OMBM) | 9.59 (9.59) | 9.77 (9.59) | 8.38 (8.3) | 7.42 (7.39) | 6.72 (6.7) | 6.17 (6.16) | 5.73 (5.72) | 5.36 (5.36) |
| | 4 | 13.43 | 14.49 | 13.71 | 13.09 | 12.59 | 12.19 | 11.86 | 11.59 |
| | 8 | *17.79* | *18.97* | *18.55* | *18.15* | *17.82* | *17.54* | *17.3* | *17.1* |
| 2 | 2 (OMBM) | — | 9.59 (9.59) | 8.34 (8.3) | 7.41 (7.39) | 6.71 (6.7) | 6.17 (6.16) | 5.73 (5.72) | 5.36 (5.36) |
| | 4 | — | *13.43* | *12.6* | *12.3* | *11.63* | *11.32* | *11.07* | *10.87* |
| | 8 | — | 17.19 | 17.11 | 16.59 | 16.24 | 16.01 | 15.86 | 15.75 |
| 4 | 2 | — | — | 9.56 | 8.52 | 7.64 | 6.9 | 6.27 | 5.73 |
| | 4 | — | — | 13.43 | 12.87 | 12.36 | 11.9 | 11.48 | 11.1 |
| | 8 | — | — | 17.39 | 17.4 | 17.04 | 16.71 | 16.4 | 16.1 |

FIG. 4a

ORTHOGONALLY-MULTIPLEXED ORTHOGONAL AMPLITUDE MODULATION METHOD

BACKGROUND OF THE INVENTION

1. Field of the Invention

The present invention relates to a coherent modulation method, and particularly to an orthogonally-multiplexed orthogonal amplitude modulation method.

2. Description of the Related Art

Depending on the number of orthogonal multiplexing levels M being used, several modulation formats have been developed for achieving high efficiency in power or in spectrum. The 2N-D biorthogonal modulation that constitutes its 4N-ary signal set by 2N orthogonal signals and the negatives of these signals, disclosed by I. S. Reed et al., in "N-orthgonal phase-modulated codes,", belongs to the extreme case in which multiplexing is used (i.e., M=1). Typical embodiments are biorthogonal 2NFSK/2PSK with a frequency modulation index $\mu=\frac{1}{2}$ and biorthogonal NFSK/4PSK with $\mu=1$, which are known to be more efficient both in power and in spectrum than orthogonal 2NFSK with $\mu=\frac{1}{2}$. In the other extreme case that the maximum number of orthogonal multiplexing levels is used (i.e., M=2N), the 2N-D orthogonally frequency-division-multiplexing (OFDM) biphase modulation is constructed by 2N spectrally-overlapping and orthogonally-multiplexed BPSK-modulated carriers (e.g., 2NOFDM/BPSK with $\mu=\frac{1}{2}$ and NOFDM/QPSK with $\mu=1$), disclosed by R. W. Chang, "Synthesis of band-limited orthogonal signals for multi-channel data transmission,". It is noted that NOFDM/QPSK with $\mu=1$ can also be regarded as being constructed by orthogonally-multiplexed QPSK-modulated carriers and thus classified to the case where N levels of orthogonal multiplexing (i.e., M=N) are employed. Due to the use of a large number of orthogonal multiplexing levels, the OFDM signals can provide improved efficiency in spectrum, especially as N is large.

In addition to the above extreme cases, the 2N-D quadrature frequency/phase modulation (NQFPM) was recently developed by S. M. Fleisher et al., in "quadrature frequency/phase modulation," IEEE Trans. Commun., vol. COM-43, pp. 1513–1524, February/March/April 1995, based on two levels of orthogonal multiplexing (i.e., M=2) NQFPM can be constructed in two equivalent formats. In the multi-frequency format, the NQFPM signal consists of a quadrature-carrier sum of two biorthogonal NFSK/2PSK signals, each with $\mu=1$. In the multi-pulse format, NQFPM is constructed by an orthogonal sum of two N-D biorthogonal component signals, each constituted by the pairwise orthogonal products of N/2 pulses and two quadrature carriers, disclosed by C. D. Chung, "differential detection of quadrature frequency/phase modulation signals," IEEE Trans. Commun., vol COM-47, pp. 546–557, April 1999. In particular, the multi-pulse 2QFPM signal specializes in the power-efficient quadrature-quadrature phase shift keying ($Q^2$PSK) signal, disclosed by D. Saha and T. G. Birdsall, "quadrature-quadrature phase shift keying," IEEE Trans. Commun., vol. COM-37, pp. 437–448, May 1989. Since a larger number of orthogonal multiplexing levels is used, NQFPM is more spectrally efficient, but less power-efficient, than biorthogonal 2NFSK/2PSK with $\mu=\frac{1}{2}$ and biorthogonal NFSK/4PSK with $\mu=1$. On the other, hand, NQFPM is less spectrally efficient, but more power-efficient, than 2NOFDM/BPSK and NOFDM/QPSK, due to the use of a smaller number of orthogonal multiplexing levels.

Although various modulation formats with 1, 2, N and 2N levels of orthogonal multiplexing have been developed, the family of 2N-D modulations employing arbitrary levels of orthogonal multiplexing have not yet exploited.

SUMMARY OF THE INVENTION

It is therefore an object of the present invention to provide a family of 2N-D modulations employing arbitrary levels of orthogonal multiplexing.

To achieve the above objects, the present invention provides a generalized signaling model to develop the family of coherent orthogonally-multiplexed orthogonal amplitude modulations. Both time-limited and band-limited signaling formats are accommodated by a generalized signal model. This model introduces new modulations which can provide a vast choice of power and spectral efficiencies ranging among classical results. The generalized optimum receiver that coherently demodulates the OMOAM signals is presented and analyzed for the AWGN channel. The BEP characteristics of coherent optimum OMOAM schemes are found to depend on the modulation parameters $N_c$, L and K, but are irrelevant to the specific form of the basis set and the associated basis signal assignment. On the other hand, the spectral analysis shows that the power spectrum shape of the OMOAM signal is determined solely by the basis set, without regard to modulation parameters nor the basis signal assignment. The modulation parameters N, M, L and K are related to the spectrum efficiency only through the influence of the data rate. These properties imply that, when practically designing an OMOAM system, the basis set and the modulation parameters can be disjointedly chosen to achieve the required spectral and power efficiencies. Further, by adjusting the basis signal assignment, many equivalent modulation formats can be found to achieve the same power and spectral efficiencies.

Spectral performance characteristics are also explored for the OMOAM signals constructed from various time-limited rectangularly and sinusoidally pulsed basis sets and band-limited root-raised-cosine pulsed basis sets. When N is large, the time-limited (N,M,L,K) OMOAM signals using rectangularly-pulsed $\Omega_1$, $\Omega_2$ and sinusoidally-pulsed $\Omega_3(N_p)$ are found to provide almost the same spectral efficiency, approaching to that of the band-limited (N,M,L,K) OMOAM signal using ideally Nyquist-pulsed $\Omega_5$ when the required out-of-band power containment is sufficiently large. The time-limited $(N,M,L,K)$ OMOAM signal using sinusoidally-pulsed $\Omega_4(1)$ is shown to yield the spectral efficiency very close to that of the band-limited (N,M,L,K) OMOAM signal using root-raised-cosine pulsed $\Omega_5$ with $\alpha=1$ for a wide range of required out-of-band power containments. Recapitulating the error and spectral performance characteristics for these OMOAM signals highlights the following general performance trends of the OMOAM family: 1) The OMOAM schemes using the same parameters $N_c$, L and K can provide the identical error performance. Further, when expanded by the same sort of basis sets with the set size varying commensurately with M, such schemes exhibit higher spectral efficiency as a larger number of orthogonal multiplexing levels is used. 2) When the parameters N, L and K are fixed, the OMOAM scheme using the same basis set yields higher spectral efficiency but lower power efficiency as a larger number of orthogonal multiplexing levels is used. 3) Out of spectrally equivalent OMOAM schemes with fixed $N_c$, the scheme using a smaller number of pulse amplitude levels is more power-efficient.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following detailed description and the accompanying drawings, which are given by way of illustration only, and thus are not limitative of the present invention, and wherein:

FIGS. 2b and 2c illustrates the diagrams of the implementation of the bandpass match-filter match to the pulsed sinusoids of the forms as the basis signals in $\Omega_1$ through $\Omega_5$.

FIG. 4a shows a list of $\gamma_b$ (in dB) required to achieve $P^b=10^{-5}$ for (N,M,L,K).

DETAILED DESCRIPTION OF THE PREFERRED EMBODIMENT

Figure 1A:
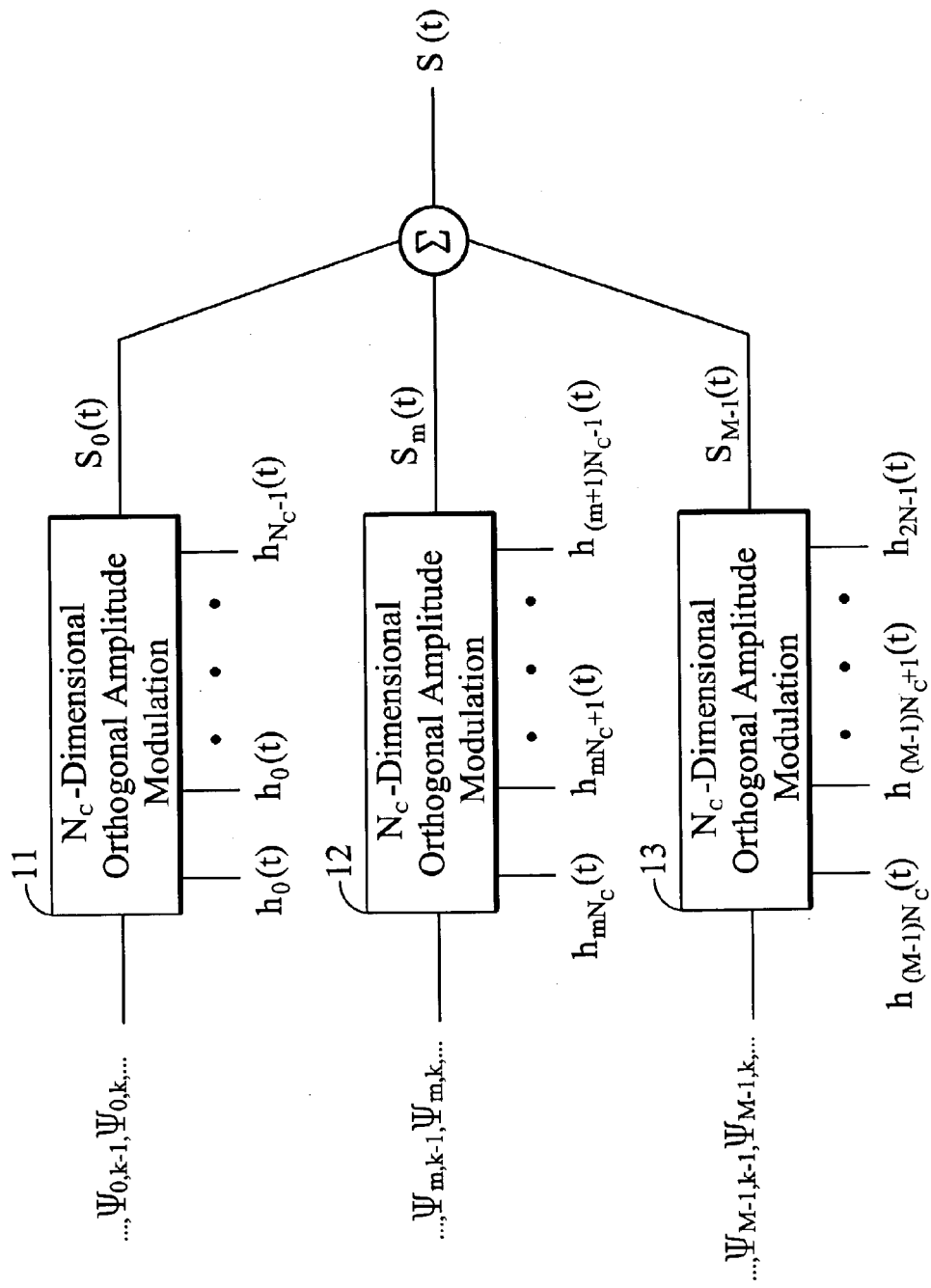
FIG. 1a illustrates a block diagram of the orthogonally-multiplexed orthogonal amplitude modulation method of the present invention.

The present invention discloses an orthogonally-multiplexed orthogonal amplitude modulation method, which is represented by OMOAM in the following description. Signal Model: Consider the memoryless OMOAM source that generates M supersymbols simultaneously and independently every T seconds, for example $\Psi_{0,k}, \Psi_{1,k}, \ldots, \Psi_{m-1,k}$ for the kth signaling time. Each supersymbol $\Psi_{m,k}$ is formed by L+1 independent symbols as $[a_{m,k}, b_{m,k}^{(0)}, b_{m,k}^{(1)}, \ldots, b_{m,k}^{(L-1)}]$ where $a_{m,k} \in \{0,1, \ldots N_c/L-1\}$ and $b_{m,k}^{(l)} \in \{\pm\beta, \pm 3\beta, \pm 5\beta, \ldots, (K-1)\beta\}$ with $\beta=\{(2/K)\Sigma_{n=1}^{K/2}(2n-1)^{-1/2}\}=\{(K^2-1)/3\}^{-1/2}$. The data sources for $\{a_{m,k}, \forall k\}$ and $\{b_{m,k}^{(l)}, \forall k\}$, l=0,1, ..., L-1, are assumed independent, memoryless and equally likely, l=0,1, ..., L-1\$, are assumed independent, memoryless and equally likely.

Thus, the OMOAM source emits $M[L \log_2 K + \log_2(N_c/L)]$ bits of information every T seconds and the data bit time $T_b$ is given by $T_b=T/M[L \log_2 K+\log_2(N_c/L)]$.

Let $$\Omega \triangleq \{h_0(t), h_1(t), \ldots, h_{2N-1}(t)\}$$

be a set of 2N real-valued unit-energy basis signals which are centered at t=0 and satisfy the constraint that all basis signals and their time-shifted signals centered at t=lT are mutually orthogonal, i.e., $$\int_{-\infty}^{\infty} h_m(t)h_n(t-lT)dt = \delta_{m,n}\delta_{l,0}, \forall m,n,l \quad (1)$$

with $\delta_{m,n}$ being the Kronecker delta function, i.e., $\delta_{m,n}=1$ if m=n and $\delta_{m,n}=0$ otherwise. Based upon $\Omega$, the OMOAM signal can be represented by an orthogonal multiplexing of M orthogonally pulse-amplitude-modulated component signals, as follows. First, $\Omega$ is partitioned into M disjoint subsets, the mth subset being defined as $$\{h_{mN_c+n}(t)\}_{n=0}^{N_c-1}.$$

Second, the mth supersymbol stream $\{\Psi_{m,k}, \forall k\}$ is orthogonally pulse-amplitude-modulated with $\{h_{mN_c+n}(t)\}_{n=0}^{N-1}$ to form the component signal $s_m(t)$, $$s_m = \sqrt{\frac{T}{ML}} \sum_k \sum_{l=0}^{L-1} b_{m,k}^{(l)} \cdot h_{mN_c+lN_c+a_{m,k}}(t-kT) \quad (2)$$

$$m = 0, 1, \ldots, M-1$$

The OMOAM signal is then constructed by multiplexing $s_m$(t)'s as $$s(t) = \sum_{m=0}^{M-1} s_m(t) \quad (3)$$

In constructing $s_m(t)$ for the kth signaling time, a group of L basis signals is selected out of $$\{h_{mN_c+n}(t)\}_{n=0}^{N_c-1}$$

according to the $N_c/L$-ary symbol $a_{m,k}$ (i.e., orthogonal group signaling), and these L chosen basis signals are individually pulse-amplitude-modulated with L K-ary amplitude symbols $b_{m,k}^{(l)}$'s (i.e., pulse amplitude signaling). Because M supersymbol streams are mutually independent, so are the M component signals $s_m(t)$'s. Since different component signals are constructed from different subsets of orthogonal basis signals satisfying (1), the criterion of zero inter-component-signal interference $$\int_{-\infty}^{\infty} s_m(t)s_n(t-lT)dt=0, \forall l \quad (4)$$

is achieved for any transmitted streams $\{\Psi_{m,k}, \forall k\}$ and $\{\Psi_{n,k}, \forall k\}$, m≠n. Furthermore, since each $s_m(t)$ is a linear combination of $\{h_{mN_c+n}(t-kT), n=01, \ldots, N_c-1, \forall k\}$ satis fying (1), the Nyquist's I criterion of zero inter-supersymbol interference is satisfied, i.e., $$\int_{-\infty}^{\infty} s_m(t)s_n(t-lT)dt=0, \forall l\neq 0, \forall m \quad (5)$$

Figure 1B:
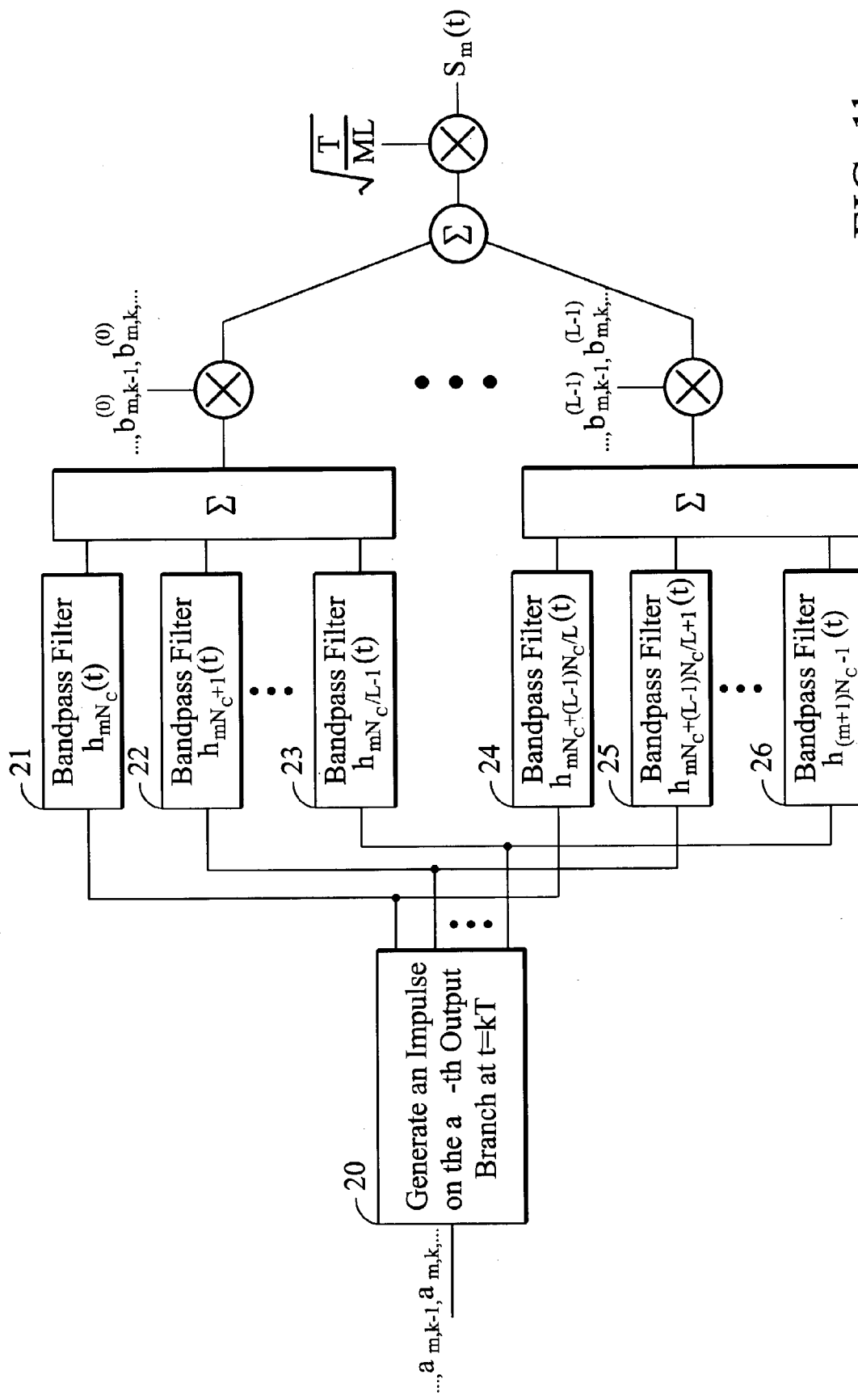
FIG. 1b illustrates the modulation block diagram of the component signal.

FIG. 1a illustrate a blockdiagram of the orthogonally-multiplexed orthogonal amplitude modulation method of the present invention. As shown in FIG. 1a, 11–13 represent the modulation blocks of the component signal $s_0(t), s_m(t), s_{M-1}(t)$ respectively. FIG. 1b illustrate the modulation blocks of the component signal $s_m(t)$. As shown in FIG. 1b, signal source generate supersymbol stream, and the basis signals are represented by equivalent band-pass filters. Since 2N basis signals are used to modulate M supersymbol streams, the implementation complexity for realizing such a transmitter is basically proportional to the order of N.

For convenience, the modulated signal defined in (3) is denoted as (N,M,L,K) OMOAM. In this shorthand notation, 2N represents the dimensionality of the signal space where s(t) resides, M is the number of orthogonal multiplexing levels used in composing s(t), L and K denote the number of orthogonal group signaling levels and the number of pulse amplitude signaling levels, respectively, used in composing all the component signals $s_m(t)$'s. Further, the ratio $N_c=2N/M$ represents the dimensionality of each component signal space. All parameters N, M, L, K and $N_c$ are integer powers of two. When N is given, the constraints $1\leq M\leq 2N$, $1\leq N_c\leq 2N$ and $1\leq L\leq N_c$ are required. When $L\geq 4$ or when $N_c/L>1$ and $K\geq 4$, the component signaling format in (2) virtually defines new modulated signals that were never exploited. This unified format introduces a vast group of new modulations, constructed by jointly using the techniques of orthogonal group signaling and pulse amplitude signaling. Further, the 2N-D OMOAM signaling formats with the number of orthogonal multiplexing levels constrained in the range 2<M<N were never treated in the modulation literature, although the concept of the orthogonal multiplexing as formulated in (3) has been well known for decades.

When K=2 (i.e., $b_{m,k}^{(l)}$'s are binary) and $L\leq 2$, the component signal $s_m(t)$ specializes to the biorthogonally modulated signal. When L=1, $s_m(t)$ can be simplified to $$s_m(t) = \sqrt{\frac{T}{M}} \sum_k b_{m,k}^{(0)} \cdot h_{mN_c+a_{m,k}}(t-kT) \quad (6)$$

The kth supersymbol is given by $\Psi_{m,k}=[a_{m,k}, b_{m,k}^{(0)}]$ where $a_{m,k}\in\{0,1,\ldots,N_c-1\}$ chooses the transmitted basis signal centered at kT (i.e., orthogonal signaling) and the binary symbol $b_{m,k}^{(0)}\in\{\pm 1\}$ decides the polarity of the chosen basis signal (i.e., biphase or antipodal signaling), $s_m(t)$ in (6) is biorthogonally modulated since the signal set for $b_{m,k}^{(0)}$. $h_{mN_c+a_{m,k}}(t-kT)$ consists of $N_c$ orthogonal signals $\{h^{mN_c+n}(t-kT)\}_{n=0}^{N_c-1}$ and the negatives of these signals. A typical embodiment is the $N_c$FSK/2PSK (with $\mu=\frac{1}{2}$), for which the constituent basis signals are specified by $$h_n(t) = g_r(t)\cos\left(\omega_0 t + \frac{n}{2}\omega_d t\right),$$

$n=mN_c, mN_c+1, \ldots, (m+1)N_c-1$, where $\omega_d\triangleq 2\pi/T$, $\omega_0$ is an integer multiple of $\omega_d$ with $\omega_0 >> \omega_d$, and $g_r(t)$ is the rectangular pulse defined by $g_r(t)=\sqrt{2/T}$ if $-T/2\leq t\leq T/2$ and $g_r(t)=0$ otherwise. When L=2, $s_m(t)$ is rewritten as $$s_m(t) = \sqrt{\frac{T}{2M}} \sum_k [b_{m,k}^{(0)} \cdot h_{mN_c+a_{m,k}}(t-kT) + b_{m,k}^{(1)} \cdot h_{mN_c+a_{m,k}+N_c/2}(t-kT)] \quad (7)$$

The kth supersymbol is given by $\Psi_{m,k}=[a_{m,k}, b_{m,k}^{(0)}, b_{m,k}^{(1)}]$, where the $(N_c/2)$-ary symbol $$a_{m,k} \in \left\{0, 1, \ldots, \frac{1}{2}N_c - 1\right\}$$

chooses a pair of basis signals centered at kT and the binary symbols $b_{m,k}^{(0)} b_{m,k}^{(1)}\in\{\pm 1\}$ determine their polarities, respectively, $s_m(t)$ in (7) is also biorthogonally modulated since the signal set for $$b_{m,k}^{(0)} \cdot h_{mN_c+a_{m,k}}(t-kT) + b_{m,k}^{(1)} \cdot h_{mN_c+a_{m,k}+N_c/2}(t-kT)$$

contains orthogonal signals $$\begin{cases} h_{mN_c+n}(t-kT) + h_{(m+1/2)N_c+n}(t-kT), \\ h_{mN_c+n}(t-kT) - h_{(m+1/2)N_c+n}(t-kT) \end{cases}_{n=0}^{\frac{N_c}{2}-1}$$

and the negatives of these signals. A typical embodiment is the $(N_c/2)$FSK/4PSK (with $\mu=1$), for which the constituent basis signals are specified by $$h_n(t) = g_r(t)\cos(\omega_0 t + n\omega_d t), h_{n+N_c/2}(t) = g_r(t)\cos(\omega_0 t + n\omega_d t),$$

$n = mN_c, mN_c + 1, \ldots, (m+1/2)N_c - 1.$

Note further that both (N,1,1) and (N,1,2) OMBM are exactly the 2N-D biorthogonal modulations.

Consider the following four basis sets in which all the basis signals $h_n(t)$'s are strictly time-limited in a way that they are nonzero only over $-T/2\leq t<T/2$. The first two sets consist of 2N rectangularly-pulsed carriers, given by $$\Omega_1 \triangleq \left\{g_r(t)\cos\left(\omega_0 t + \frac{1}{2}n\omega_d t\right), n = 0, 1, \ldots, 2N-1\right\} \quad (8)$$

$$\Omega_2 \triangleq \begin{cases} g_r(t)\cos(\omega_0 t + n\omega_d t), \\ g_r(t)\sin(\omega_0 t + n\omega_d t), n = 0, 1, \ldots, N-1 \end{cases} \quad (9)$$

The other two sets are composed of 2N sinusoidally-pulsed carriers as $$\Omega_3 \triangleq \begin{Bmatrix} g_{c,n}(t)\cos(\omega_0 t + 2mN_p\omega_d t), \; g_{c,n}(t)\sin(\omega_0 t + 2mN_p\omega_d t), \; g_{s,n}(t)\cos(\omega_0 t + 2mN_p\omega_d t), \\ g_{s,n}(t)\sin(\omega_0 t + 2mN_p\omega_d t), \; m=0,1,\ldots, N/(2N_p)-1; n=0,1,\ldots, N_p-1 \end{Bmatrix} \quad (10)$$

$$\Omega_4 \triangleq \{g_{c,n}(t)\cos(\omega_0 t + 2mN_p\omega_d t), \; g_{c,n}(t)\sin(\omega_0 t + 2mN_p\omega_d t), \quad (11)$$
$$m=0,1,\ldots, N/N_p-1; n=0,1,\ldots, N_p-1\}$$

where $g_{c,n}(t)$ and $g_{s,n}(t)$ are sinusoidal pulse, defined by $$g_{c,n}(t) = \sqrt{4/T}\cos\left(\left(n+\frac{1}{2}\right)\omega_d t\right)$$

if $-T/2 \leq t < T/2$ and $g_{c,n}(t)=0$ otherwise, and $$g_{s,n} = \sqrt{\frac{4}{T}}\sin\left(\left(n+\frac{1}{2}\right)\omega_d t\right)$$

if $-T/2 \leq t < T/2$ and $g_{s,n}(t)=0$ otherwise. Here $N_p$ represents the number of pulse frequencies being used, with $N_p \in \{1,2,\ldots, N/2\}, \Omega_3(N_p)$ and $N_p \in \{1,2,\ldots, N\}, \Omega_4(N_p)$.

Using these basis sets in conjunction with specified basis signal assignments, some time-limited 2N-D OMBM and OMOAM with properly chosen levels of orthogonal multiplexing and orthogonal group signaling specialize to classical modulations as follows.

B.1) 2NFSK/2PSK: Using $\Omega_1$ with the assignment $$h_n(t) = g_r(t)\cos\left(\omega_0 t + \frac{n}{2}\omega_d t\right), n=0,1,\ldots, 2N-1, (N,1,1)$$

OMBM specializes to the (rectangularly-pulsed) biorthogonal 2NFSK/2PSK signal $$s(t) = \sqrt{T}\sum_k g_r(t-kT)\cos\left(\omega_0 t + \frac{1}{2}a_k\omega_d t + \phi_k\right) \quad (12)$$

with $a_k \in \{0,1,\ldots, 2N-1\}$ and $\phi_k \in \{0, \pi\}$ being independent data symbols.

B.2) NFSK/4PSK: Using $\Omega_2$ with the assignment $h_n(t)=g_r(t)\cos(\omega_0 t+n\omega_d t)$, and $h_{n+N}(t)=g_r(t)\cos(\omega_0 t+n\omega_d t)$, $n=0,1,\ldots, N-1$, (N,1,2) OMBM specializes to the (rectangularly-pulsed) biorthogonal NFSK/4PSK signal $$s(t) = \sqrt{T}\sum_k g_r(t-kT)\cos(\omega_0 t + a_k\omega_d t + \phi_k) \quad (13)$$

with $a_k \in \{0,1,\ldots, N-1\}$ and $\phi_k \in \{\pi/4, 3\pi/4, 5\pi/4, 7\pi/4\}$ being independent data symbols.

B.3) NQFPM and $Q^2$ PSK: Using $\Omega_2$ with the assignment $h_n(t)=g_r(t)\cos(\omega_0 t+n\omega_d t)$, and $h_{n+N}(t)=g_r(t)\cos(\omega_0 t+n\omega_d t)$, $n=0,1,\ldots, N-1$, (N,2,1) OMBM specialize to NQFPM in the multi-frequency format, with the signaling from $$s(t) = \sqrt{\frac{T}{2}}\sum_k g_r(t-kT)\cos(\omega_0 t + a_{0,k}\omega_d t + \phi_{0,k}) + \quad (14)$$
$$g_r(t-kT)\sin(\omega_0 t + a_{1,k}\omega_d t + \phi_{1,k})$$

where $a_{0,k}, a_{1,k} \in \{0,1,\ldots, N-1\}$ and $\phi_{0,k}, \Phi_{1,k} \in \{0,\pi\}$ are independent data symbols. Moreover, using $\Omega_3(N/2)$ with the assignment $h_n(t)=g_{c,n}(t)\cos(\omega_0 t), h_{n+N/2}(t)=g_{s,n}(t)\sin(\omega_0 t), h_{n+N}(t)=g_{s,n}(t)\cos(\omega_0 t), h_{n+3N/2}(t)=g_{c,n}(t)\sin(\omega_0 t)$ $n=0,1,\ldots, N/2-1$, (N,2,2) OMBM specializes to NQFPM in the multi-pulse format. In this case, $$s(t) = \sqrt{\frac{T}{4}}\sum_k g_{c,a_{0,k}}(t-kT)\cos(\omega_0 t + \phi_{0,k}) + \quad (15)$$
$$g_{s,a_{0,k}}(t-kT)\sin(\omega_0 t + \phi_{1,k}) +$$
$$g_{c,a_{1,k}}(t-kT)\cos(\omega_0 t + \phi_{2,k}) + g_{s,a_{1,k}}(t-kT)\sin(\omega_0 t + \phi_{3,k})$$

with $a_{0,k}, a_{1,k} \in \{0,1,\ldots, N/2-1\}$ and $\phi_{0,k}, \phi_{1,k}, \phi_{2,k}, \phi_{3,k} \in \{0,\pi\}$ being independent data symbols. When N=2, (15) simplifies to $$s(t) = \sqrt{\frac{T}{2}}\sum_k g_{c,0}(t-kT)\cos(\omega_0 t + \phi_{c,k}) + g_{s,0}(t-kT)\sin(\omega_0 t + \phi_{s,k}) \quad (16)$$

with $\phi_{c,k}, \phi_{s,k} \in \{\pi/4, 3\pi/4, 5\pi/7, 7\pi/4\}$. This is exactly the $Q^2$PSK.

B.4) Sinusoidally-Pulsed NQFPM: Using $\Omega_4(1)$ with the assignment $h_n(t)=g_{c,0}(t)\cos(\omega_0 t+2n\omega_d t)$ and $h_{n+N}(t)=g_{c,0}(t)\sin(\omega_0 t+2n\omega_d t)$ $n=0,1,\ldots, N-1$,(N,2,1) OMBM specializes to sinusoidally-pulsed NQFPM in the multi-frequency format, which has the same form of (14) with $g_r(t-kT)$ replaced by $g_{c,0}(t-kT)$ and $\omega_d$ replaced by $2\omega_d$. If the two component signals are offset by $T/2$ seconds, the resultant signal becomes exactly the continuous-phase NQFPM.

B.5) 2NOFDM}/BPSK: Using $\omega_1$ with the assignment $$h_n(t) = g_r(t)\cos\left(\omega_0 t + \frac{n}{2}\omega_d t\right) \ n = 0, 1, \ldots, 2N-1, (N, 2N, 1)$$

OMBM specializes to the rectangularly-pulsed 2N OFDM/BPSK signal $$s(t) = \sqrt{\frac{T}{2N}} \sum_k \sum_{m=0}^{2N-1} g_r(t-kT)\cos\left(\omega_0 t + \frac{1}{2}m\omega_d t + \phi_{m,k}\right) \quad (17)$$

with $\phi_{m,k} \in \{0,\pi\}$, $m=0,1,\ldots 2N-1$, being independent data symbols.

B.6) NOFDM/K²QAM and NOFDM}/QPSK: Using $\Omega_2$ with the assignment $h_{2n}(t) = g_r(t)\cos(\omega_0 t + n\omega_d t)$ and $h_{2n+1}(t) = g_r(t)\sin(\omega_0 t + n\omega_d)$, $n=0,1,\ldots, N-1$, $(N,N,2,K)$ OMOAM specializes to the rectangularly-pulsed NOFDM/K²QAM signal $$s(t) = \qquad (18)$$
$$\sqrt{\frac{T}{N}} \sum_k \sum_{m=0}^{N-1} g_r(t-kT)[b_{m,k}^{(0)}\cos(\omega_0 t + m\omega_d t) + b_{m,k}^{(1)}\sin(\omega_0 t + m\omega_d t)]$$

with $b_{m,k}^{(0)}, b_{m,k}^{(1)} \in \{\pm\beta, \pm 3\beta, \pm 5\beta, \ldots, \pm(K-1)\beta\}$, $m=0,1,\ldots, N-1$, being independent data symbols.

When K=2, it specializes to rectangularly-pulsed NOFDM/QPSK $$s(t) = \sqrt{\frac{T}{N}} \sum_k \sum_{m=0}^{N-1} g_r(t-kT)\cos(\omega_0 t + m\omega_d t + \phi_{m,k}) \quad (19)$$

with $\phi_{m,k} \in \{\pi/4, 3\pi/4, 5\pi/4, 7\pi/4\}$, $m=0,1,\ldots, N-1$, being independent data symbols.

Consider the basis set that consists of 2N pulsed carriers, as $$\Omega_5 \triangleq \{g_b(t)\cos(\omega_0 t + 2\pi n\Delta f t), g_b(t)\sin(\omega_0 t + 2\pi n\Delta f t)\}_{n=0}^{N-1} \quad (20)$$

in which $\Delta f$ is the frequency separation between adjacent-frequency carriers with $2\pi\Delta f \ll \omega_0$ and the real-valued pulse $g_b(t)$ is assumed band-limited so that its Fourier transform $G_b(f)$ is nonzero only over a finite-length interval centered around $f=0$. To meet the constraint (1), both $G_b(f)$ and $\Delta f$ should satisfy the criterion $$\int_{-\infty}^{\infty} G_b(f-n\Delta f)G_b^*(f-m\Delta f)\exp\{j2\pi df T\} df = 2\delta_{n,m}\delta_{l,0} \ \forall l,m,n \quad (21)$$

If we further impose an additional constraint that adjacent-frequency pulsed carriers are nonoverlapping in the frequency domain, namely $G_b(f)=0, |f| > \Delta f/2$, (21) an be simplified to the Nyquist's I criterion for zero intersymbol interference, $$\int_{-\infty}^{\infty} G_b(f)G_b^*(f)\exp\{j2\pi df T\} df = 2\delta_{l,0} \ \forall l \quad (22)$$

A typical solution to (22) is the root raised cosine spectrum $G_b(f)=\sqrt{2T}$ for $|f|<(1-\alpha)/(2T)$, $G_b(f)=\sqrt{2T}\cos(\pi(|f|T-(1-\alpha)/2)/(2\alpha))$ for $(1-\alpha)/(2T) \leq |f| < (1+\alpha)/(2T)$, $G_b(f)=0$ otherwise where $\alpha$ is the roll-off factor with $0 \leq \alpha < 1$ It is noted that the minimum value of $\Delta f$ to ensure that two adjacent-frequency pulsed carriers do not overlap in the frequency domain is given by $\Delta f=(1+\alpha)/T$. When $\alpha=0$ and $\Delta f=1/T$ the root raised cosine spectrum reduces to the ideal Nyquist spectrum $G_b(f)=\sqrt{2T}$ for $|f|<\frac{1}{2}T$ and $G_b(f)=0$ otherwise.

Optimum Decision Rule: Consider the coherent demodulation of the (N,M,L,K) OMOAM signal on the AWGN channel, assuming that the receiver is perfectly aligned in time, carrier frequency and phase with the received signal. Let $r(t) = \sqrt{P}\, s(t) + n(t)$ be the received signal, where P is the received power and n(t) is the AWGN with mean zero and one-sided power spectral density (PSD) level $N_0$. Because all possible waveforms for s(t) are generated equally likely, the optimum coherent receiver that minimizes the probability of error in detecting s(t) is known to be a maximum-likelihood (ML) receiver. Since the component signals $s_m(t)$'s are mutually independent and orthogonal, the ML receiver can be realized based on the componentwise processing. Furthermore, since each component signal satisfies the Nyquist's I criterion of zero inter-supersymbol interference, the ML receiver can be simply realized based on the componentwise supersymbol-by-supersymbol processing. It follows that the optimum decision rule is tantamount to choosing $$\hat{\Psi} \triangleq [\hat{a}_{m,k}, \hat{b}_{m,k}^{(0)}, \hat{b}_{m,k}^{(1)}, \ldots, \hat{b}_{m,k}^{(L-1)}]$$

corresponding to $$\min_{\Psi_{m,k}} \int_{-\infty}^{\infty} \left[r(t) - \sqrt{\frac{PT}{ML}} \sum_{l=0}^{L-1} b_{m,k}^{(l)} \cdot h_{mN_C + lN_C/L + a_{m,k}}(t-kT)\right]^2 dt \quad (23)$$

for each m and k. Discarding irrelevant terms, the optimum rule simplifies to choosing $\hat{\Psi}_{m,k}$ corresponding to $$\max_{\Psi_{m,k}} V_1(\Psi_{m,k}) \quad (24)$$

for each m and k, in which the measurement $V_1(\Psi_{m,k})$ is defined by $$V_1(\Psi_{m,k}) \triangleq \sum_{l=0}^{L-1} b_{m,k}^{(l)} R_{mN_C + lN_C/L + a_{m,k}, k} - \frac{1}{2}\sqrt{\frac{PT}{ML}} \sum_{l=0}^{L-1} (b_{m,k}^{(l)})^2 \quad (25)$$

and $R_{n,k}$ is the correlation measurement between and $h_n(t-kT)$, defined by $$R_{n,k} \triangleq \int_{-\infty}^{\infty} r(t) h_n(t-kT) dt \quad \forall n = 0, 1, 2 \ldots, 2N-1 \quad (26)$$

The decision test in (17) involves $K^L(N_c/L)$ maximization of $V_1(\Psi_{m,k})$'s and around $K^L N_c$ real multiplications for each m and k. the test can be equivalent conducted by $$\max_{\Psi_{m,k}} V_1(\Psi_{m,k}) = \qquad (27)$$

$$\max_{a_{m,k}} \sum_{l=0}^{L-1} \max\left\{ b_{m,k}^{(l)} R_{mN_c+lN_c/L+a_{m,k}} - \frac{1}{2}\sqrt{\frac{PT}{ML}} \sum_{l=0}^{L-1} \left(b_{m,k}^{(l)}\right)^2 \right\}$$

which requires a totality of $KN_c$ maximization and around $KN_c$ real multiplication for each m and k. this alternative test is simpler to implement. The realization of (24) requires the prior knowledge of the received signal power. When K=2, (24) can be further simplified, by noting that $(b_{m,k}^1)^2=1$, to choosing $\hat{\Psi}_{m,k}$ corresponding to $$\max_{\Psi_{m,k}} V_2(\Psi_{m,k}) \qquad (28)$$

for each m and k, in which $V_2(\Psi_{m,k})$ is defined by $$V_2(\Psi_{m,k}) \triangleq \sum_{l=0}^{L-1} b_{m,k}^{(l)} R_{mN_c+lN_c/L+a_{m,k}} \qquad (29)$$

Figure 2A:
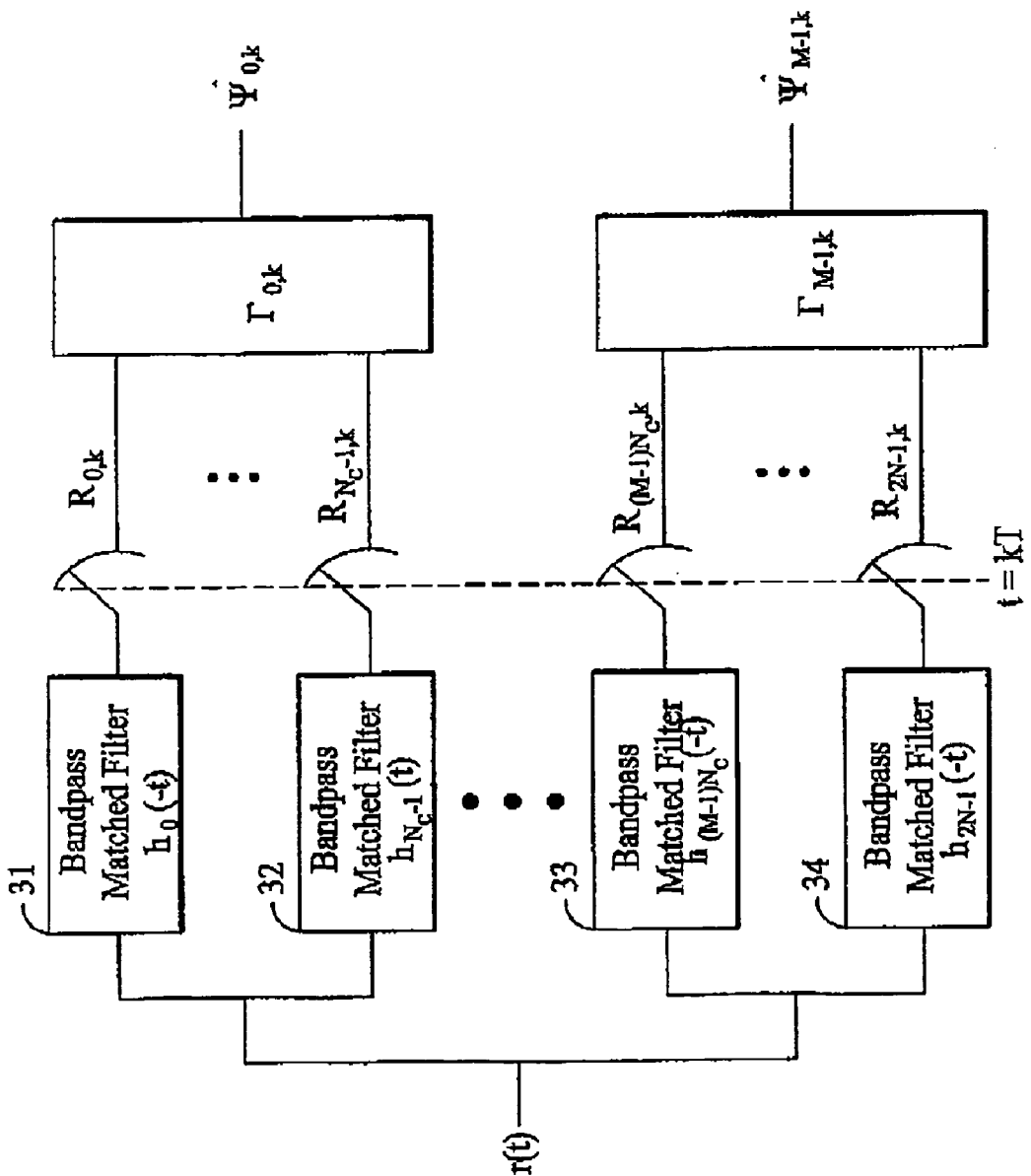
FIG. 2a illustrates the bandpass match-filters for realizing the above optimum rules.

The realization of (28) is devoid of the side information of the received power and is thus simpler to implement than (24). FIG. 2a illustrates the bandpass match-filters for realizing the above optimum rules. As shown in FIG. 2a, the match-filter 31-34 input the received signal r(t) and output correlation measurements at signal time kT. FIGS. 2b and 2c further diagram the implementation of the bandpass match-filter match to the pulsed sinusoids of the forms as the basis signals in $\Omega_1$ through $\Psi_5$. It is noted that 2N bandpass matched filter and M decision boxes are required for realizing the optimum receiver. Since each decision box can be digitally realized and is generally simpler to implement than the analog bandpass-match filters, the implementation complexity of the receiver is dominated by the bandpass-match filters and grows on the order of N. As shown in FIG. 2b, the realization for the bandpass match-filter is $h_n(t)=g(t)\cos(\omega t)$ with $\omega T/\pi$ being an integer. The parameter $\zeta_k$ is given by $\zeta_k=1$ when $k\omega T/\pi$ is even and $\zeta_k=-1$ otherwise. As shown in FIG. 2c, the realization for the bandpass match-filter is $h_n(t)=g(t)\sin(\omega t)$ with $\omega T/\pi$ being an integer. The parameter $\zeta_k$ is given by $\zeta_k=1$ when $k\omega T/\pi$ is even and $\zeta_k=-1$ otherwise.

BEP Bound for OMOAM: Since $\{R_{n,k}, \forall n, \forall k\}$ are independent measurement and the supersymbol sources for $\Psi_{m,k}$'s are memoryless and independent, detecting $\Psi_{m,k}$ based on $\{R_{mN_c+n,k}\}_{n=0}^{N_c-1}$, for $m \neq l, k \neq i$. As result, the probability of error in optimumly detecting the (N,M,L,K) OMOAM signal is equivalent to the probability of error in detecting a single supersymbol $\Psi_{m,k}$ by using rule (24) or (28). Assuming further that M supersymbol streams are encoded independently by use of the identical code mapping of bits to $K^L N_c/L$-ary supersymbols, the BEP of the optimum OMOAM rule is exactly given by the BEP of the optimum rule for detecting $\Psi_{m,k}$. This is what we pursue in the following. Without loss of generality, we consider the decision on $\Psi_{0,0}$ (i.e., m=0 and k=0) by using rule (24) and the subscript indices m and k on $\Psi_{m,k}, a_{m,k}, b_{m,k}^{(1)}$ and $R_{n,k}$ are dropped for notational simplicity.

Let $\Psi=[a,b]$ be the transmitted supersymbol and $\hat{\Psi}=[\hat{a},\hat{b}]$ the detected supersymbol, in which the vectors $$b \triangleq [b^{(0)}, b^{(1)}, \ldots, b^{(L-1)}]$$

and $$\hat{b} \triangleq \left[\hat{b}^{(0)}, \hat{b}^{(1)}, \ldots, \hat{b}^{(L-1)}\right]$$

are conveniently defined. There are $K^L(N_c/L)$ possible supersymbols that can be transmitted equally likely and the total number of information bits represented by $\Psi$ is $L \log_2 K + \log_2(N_c/L)$. Further, denote $D_H(\Psi, \hat{\Psi})$ as the Hamming distance between the binary representations of supersymbols $\Psi$ and $\hat{\Psi}$ and $Pr\{\hat{V}_1 > V_1, \Psi\}$ as the pairwise error probability that $V_1(\hat{\Psi})$ is greater than $V_1(\Psi)$ when was indeed transmitted. Following the same union bound argument of "digital communication technique" Simon et al., Prentice Hall, 1995, the BEP of optimum (N,M,L,K) OMOAM is bounded by $$P_b \leq \sum_{\Psi} \frac{1}{K^L(N_c/L)} \sum_{\Psi \neq \hat{\Psi}} \frac{D_H(\Psi, \hat{\Psi})}{L\log_2 K + \log_2(N_c/L)} Pr\{\hat{V}_1 > V_1, \Psi\} \qquad (30)$$

where the pairwise error probability is shown as $$Pr\{\hat{V}_1 > V_1, \Psi\} = Q\left(\sqrt{\lambda_{\gamma_b}|\hat{b}-\hat{b}|^2}\right) \text{ if } \hat{a} \neq a \qquad (31)$$

$$Pr\{\hat{V}_1 > V_1, \Psi\} = Q\left(\sqrt{\lambda_{\gamma_b}(|\hat{b}|^2 + |b|^2)}\right) \text{ if } \hat{a} \neq a \qquad (32)$$

with $$Q(x) \triangleq \frac{1}{\sqrt{2\pi}} \int_x^{\infty} \exp\{-y^2\} dy$$

being the Gaussian tail integral, $\lambda \triangleq [L\log_2 K + \log_2(N_c/L)/(2L)]$ and $\gamma_b \triangleq PT_b/N_0$ the ratio of received signal energy per bit to noise PSD level. Evidently, all (N,M,L,K) OMOAM schemes with the same values of $N_c$, L and K yield the same BEP, whichever $\Omega$ and basis signal assignment are used.

The bound in (30) holds valid for arbitrary bits-to-super-symbols code mapping scheme for $\Psi$. If symbols $a, b^{(0)}, b^{(1)}, \ldots, b^{(L-1)}$ are assumed to be encoded independently by the respective bits-to-symbols code mapping schemes, the bound can be further simplified, by noting that $$D_H(\hat{\Psi}, \Psi) = D_H(a, \hat{a}) + D_H(b, \hat{b}) \text{ and} \qquad (33)$$

$$\sum_{\hat{a}}\sum_{a} D_H(a, \hat{a}) = \frac{1}{2}(N_C/L)^2 \log_2(N_C/L), \text{ as}$$

$$P_b \le \frac{W_1 + W_2}{K^L(N_C/L)[L\log_2 K + \log_2(N_C/L)]}$$

where $W_1$ and $W_2$ represent the sum of $D_H(\Psi,\hat{\Psi})\Pr\{\hat{V}_1 > V_1, \Psi\}$ corresponding to $\hat{a}=a$ and $\hat{a}\ne a$, respectively, and are given by $$W_1 \triangleq \frac{N_C}{L}\sum_{b}\sum_{\hat{b}\ne b} D_H(b, \hat{b}) Q\left(\sqrt{\lambda\gamma_b|\hat{b}-b|^2}\right) \qquad (34)$$

$$W_2 \triangleq \sum_{b}\sum_{\hat{b}}\left[\frac{1}{2}\left(\frac{N_c}{L}\right)^2 \log_2\left(\frac{N_c}{L}\right) + \left(\left(\frac{N_c}{L}\right)^2 - \frac{N_c}{L}\right)D_H(b, \hat{b})\right] \cdot \qquad (35)$$

$$Q\left(\sqrt{\lambda\gamma_b(|\hat{b}|^2 + |b|^2)}\right)$$

When K=2, $W_1$ and $W_2$ are derived as $$W_1 = \frac{N_c}{L}\sum_{l=1}^{L} 2^L I\binom{L}{l} Q\left(\sqrt{4l\lambda\gamma_b}\right) \qquad (36)$$

$$W_2 = 2^{2L-1}\left[\left(\frac{N_c}{L}\right)^2 \log_2\left(\frac{N_c}{L}\right) + \left(\frac{N_c^2}{L} - N_c\right)\right] Q\left(\sqrt{2L\lambda\gamma_b}\right) \qquad (37)$$

Assuming the Gray code mapping scheme for representing each $b^{(l)}$, the asymptotic BEP bounds for K>2 are derived based on the smallest two arguments of Q functions, which have the same form of (33) with $W_1$ and $W_2$ approximated by $$W_1 \cong N_c(2K-2)Q\left(\sqrt{4\beta^2\lambda\gamma_b}\right) \qquad L=1 \qquad (38)$$

$$W_2 \cong 2[N_c^2 \log_2 N_c + (N_c^2 - N_c)]Q\left(\sqrt{2\beta^2\lambda\gamma_b}\right)$$

$$W_1 \cong \frac{N_c}{L}\sum_{l=1}^{2} I\binom{L}{l}(2K-2)^l K^{L-1} Q\left(\sqrt{4\beta^2 l\lambda\gamma_b}\right)$$

$$W_2 \cong 2^{2L-1}\left[\left(\frac{N_c}{L}\right)^2 \log_2\left(\frac{N_c}{L}\right) + \left(\frac{N_c^2}{L} - N_c\right)\right] Q\left(\sqrt{2\beta^2 L\lambda\gamma_b}\right) \quad L=2,4 \qquad (39)$$

$$W_1 \cong \frac{N_c}{L}\sum_{l=1}^{2} I\binom{L}{l}(2K-2)^l K^{L-1} Q\left(\sqrt{4\beta^2 l\lambda\gamma_b}\right)$$

$$W \cong 0 \qquad L=8, 16, \ldots \qquad (40)$$

Figure 3:
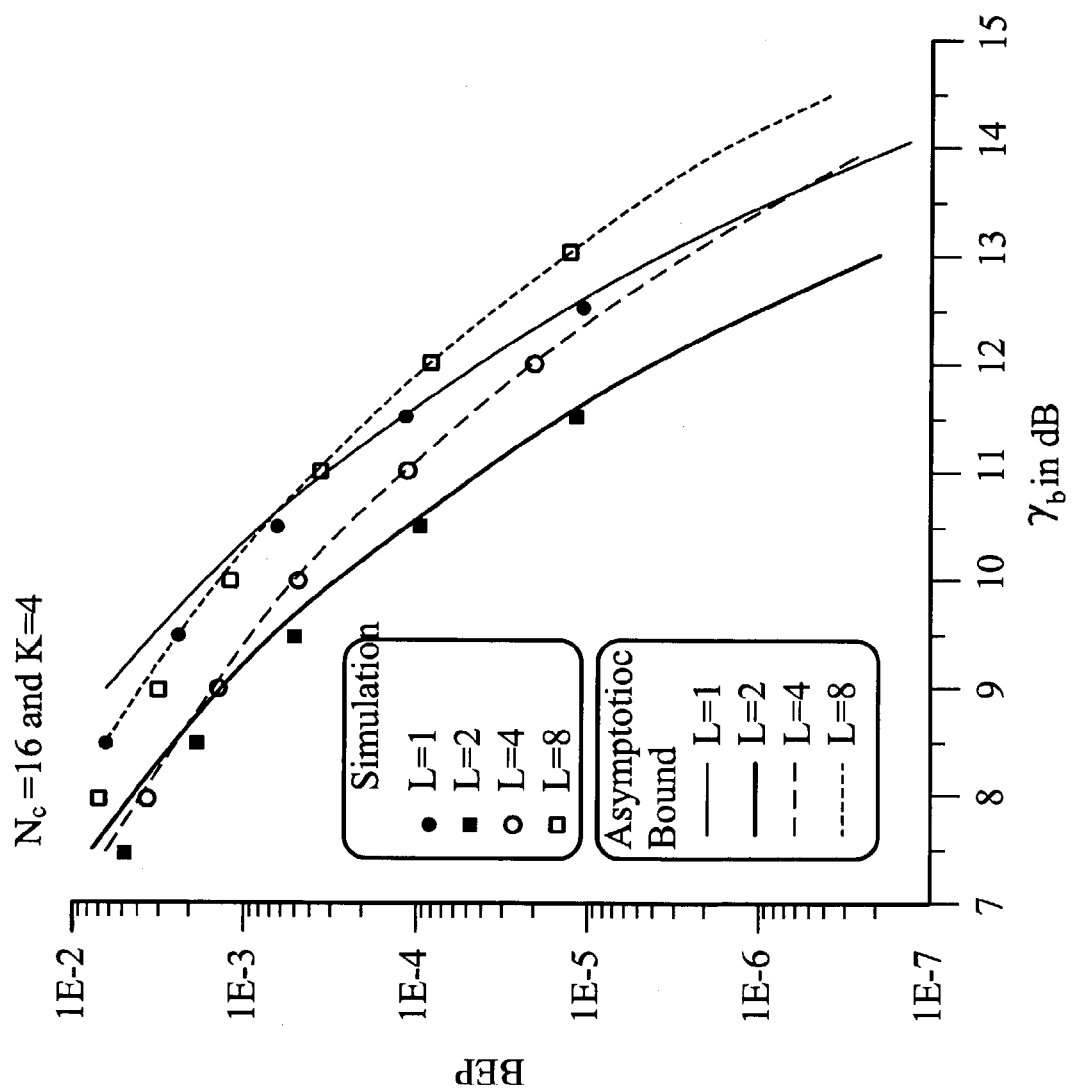
FIG. 3 illustrates the asymptotic bounds compared with the simulation results.

(31), (32), and (33) hold for arbitrary code mapping schemes for a. As illustrated in FIG. 3 wherein the asymptotic bounds are compared with the simulation results, the asymptotic bounds can provide accurate estimates of true BEP when BEP is below $10^{-3}$.

Assuming independent coding schemes among $a, b^{(0)}, b^{(1)}, \ldots, b^{(L-1)}$ and the Gray code for representing each $b^1$, FIG. 4a compares the performance trend on the power efficiencies among optimum OMOAM schemes with L, K and $N_c$ varied. List of $\gamma_b$ (in dB) required to achieve $P^b=10^{-5}$ for (N,M,L,K) is shown in FIG. 4a. The boldface entries highlights the results for spectrally equivalent (N,M,1,4) OMOAM and (N,M,4,2) OMOAM, while the italic entries correspond to the result for spectrally equivalent (N,M,1,8) OMOAM and (N,M,2,4) OMOAM. In the entries corresponding to the rows with (L,K)=(1,2) and (L,K)=(2,2), the value of $\gamma_b$ required to achieved $P_b=10^{-5}$ for optimumly-coded (N,M,L) OMBM are also given. As indicated, when L and K are fixed, the power efficiency of OMOAM improves with an increasing $N_c$, provided that $N_c \geq 2$. This resembles the well-known trend that the orthogonally modulated signal is more efficient in power as the number of orthogonality levels is incresed. It can also be observed in FIG. 4a that, when $N_c$ and L are fixed, OMOAM with a smaller K can provide higher power efficiency. This latter trend resembles the well-known error performance improvement associated with the fixed-carrier pulse-amplitude-modulated signaling schemes by decreasing the number of amplitude levels.

Both (N,M,$L_1$,$K_1$) OMOAM and (N,M,$L_2$,$K_2$) OMOAM using the same $\Omega$ exhibit the same spectral efficiency when they carry the same number of bits per T seconds, namely $M[L_1 \log_2 K_1 + \log_2(N_c/L_1)] = M[L_2 \log_2 K_2 + \log_2(N_c/L_2)]$. For example, (N,M,1,4) OMOAM and (N,M,4,2) OMOAM are such two modulation, and so are (N,M,1,8) OMOAM and (N,M,2,4) OMOAM. The power efficiencies corresponding to these two sets of modulation are highlighted in FIG. 4a by boldface and italic entries, respectively. As indicated, out of two spectrally equivalent OMOAM schemes with fixed $N_c$, the scheme with a smaller K, or equivalently with a larger L, can provide higher power efficiency. This demonstrates that prevailing power efficiencies can be achieved without sacrificing the spectral efficiency by appropriately making K smaller and L larger.

BEP Bound for Optimumly-Coded OMBM: Consider the (N,M,L) OMBM signals with M supersymbol streams $\{\Psi_{m,k}, \forall k\}$, $m=0,1,\ldots,M-1$, independently encoded by use of the identical code mapping of bits to $2N_c$-ary supersymbols. For each m, a single $(1+\log_2 N_c)$-bit data word is used to represent the supersymbol $\Psi_{m,k}$ according to a bits-to-supersymbols code mapping of "Telecommunication Systems engineering" W. C. Lindsay et al., Prentice Hall, 1973, in which complementary data bit words are encoded into complementary supersymbols. As shown in "Telecommunication Systems engineering" of Lindsay and "quadrature frequency . . . " of Fleisher, such a mapping minimizes the average BEP of the optimum coherent $N_c$ biorthogonal modulation scheme for a given supersymbol error probability. Since the optimum (N,M,L) OMBM decision rule exhibits exactly the same BEP performance as the optimum rule for detecting the $N_c$-D biorthogonally modulated signals, this code mapping scheme yields the minimum achievable average BEP for the optimum (N,M,L) OMBM rule. Quoting "Telecommunication Systems Engineering" p. 212, Lindsay and "quadrature frequency . . . " Fleisher, eq. 16b for optimum decision of $N_c$-D biorthogonally modulated signals, the minimum BEP of optimum (N,M,1) and (N,M,2) OMBM can be tightly bounded $$\text{by } P_b \leq (N_c-1)Q(\sqrt{\gamma_b(1+\log_2 N_c)}) + Q(\sqrt{2\gamma_b(1+\log_2 N_c)}) \tag{41}$$

Figure 4B:
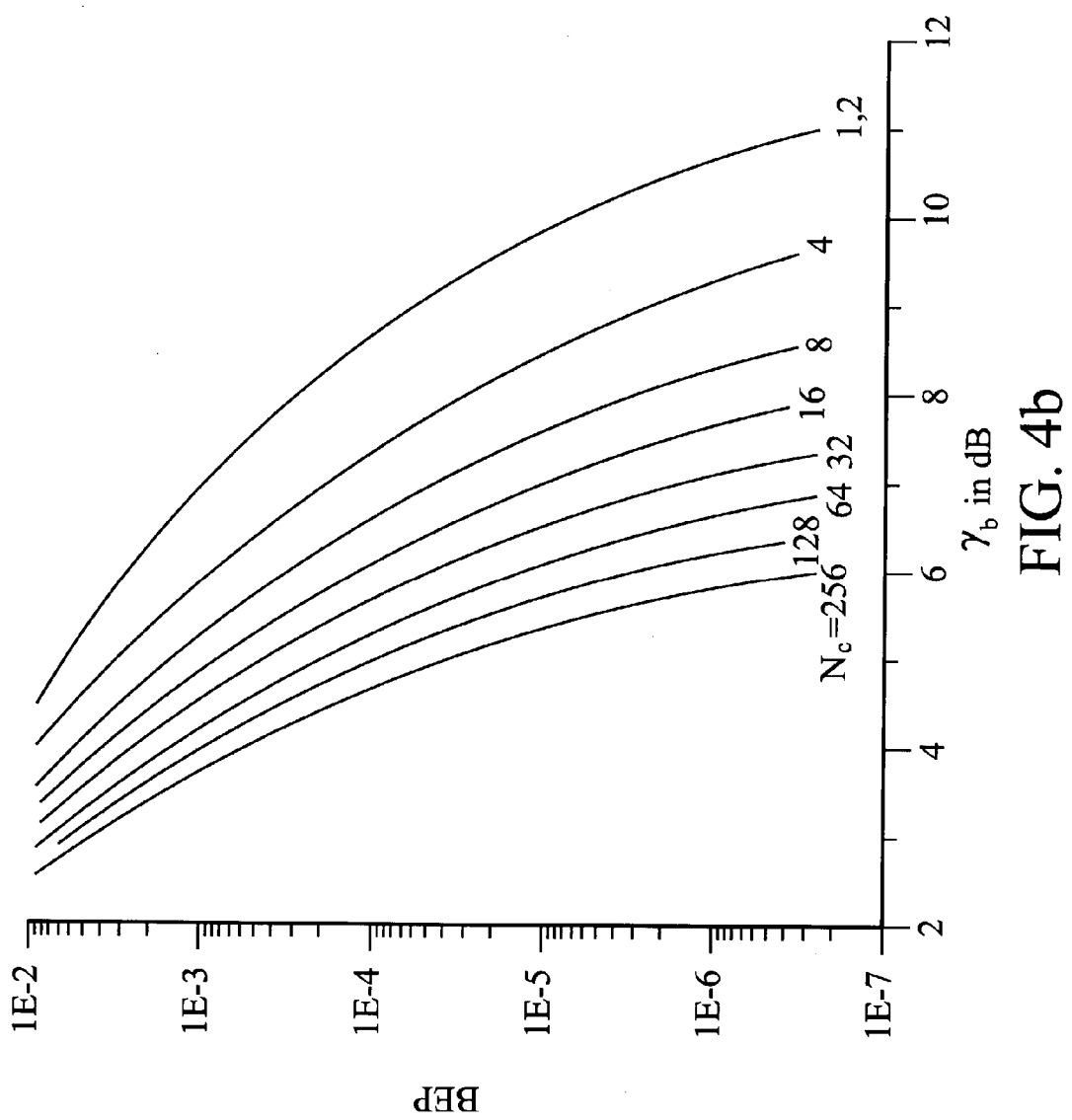
FIG. 4b shows bit error probability of optimumly-coded OMBM schemes with fixed $N_c$ values.

This bound is essentially very tight when $P_b$ is smaller than $10^{-3}$. For a large $\gamma_b$, since the bound is dominated by the arguments of Q functions, the OMBM with a larger $N_c$ yields better BEP. This trend is illustrated in FIG. 4b. As also shown therein, OMBM with $N_c=1$ yields approximately the same BEP as OMBM with $N_c=2$. The values of $\gamma_b$ to achieve $P_b=10^{-5}$ for optimumly-coded OMBM are also listed in FIG. 4a. It is shown that slight performance improvement can be achieved by the optimumly coded OMBM versus the OMBM using independent Gray code schemes for representing $a, b^{(0)}, b^{(1)}, \ldots, b^{(L-1)}$.

Spectral Properties: Evaluation of Power Spectral Densities: Because the (N,M,L,K) OMOAM signal is constructed by M independent component signals which have zero mean, its PSD consists of continuous spectrum elements and is a sum of the PSD's of the component signals. Furthermore, since each $s_m(t)$ is orthogonal to its time-shifted version $s_m(t-lT)$, $l \neq 0$, and the source for $\{\Psi_{m,k}, \forall k\}$ is memoryless, the PSD of $s_m(t)$ can be obtained from the constituent signal bearing one specific $\Psi_{m,k}$. Considering k=0 without loss of generality and quoting "Digital Communication Technique" eq. 2.57, M. K. Simon, 1995, the PSD of (N,M,L,K) OMOAM is given by $$S(f) = \sum_{m=0}^{M-1} \frac{1}{K^L(N_c/L)T} \tag{42}$$

$$\sum_{a_{m,0}} \sum_{\{b_{m,0}^{(l)}\}_{l=0}^{L-1}} \left| \sqrt{\frac{T}{ML}} \sum_{l=0}^{L-1} b_{m,0}^{(l)} H_{mN_c+lN_c/L+a_{m,0}}(f) \right|^2 =$$

$$\frac{1}{2N} \sum_{n=0}^{2N-1} |H_n(f)|^2$$

with $H_n(f)$ being the Fourier transform of $h_n(t)$. The second equality holds good because given $a_{m,0}$ the random quantities $b_{m,0}^{(l)} H_{mN_c+lN_c/L+n_{m,0}}(f), \forall l$, are conditionally independent with zero mean. It is seen that the (N,M,L,K) OMOAM signal based on the same $\Omega$ exhibits the same PSD for all values of M, L and K and for arbitrary basis signal assignments.

Since rectangularly-pulsed 2NFSK/2PSK with $\mu=\frac{1}{2}$ is an embodiment of (N,1,1,2) OMOAM using $\Omega_1$, all OMOAM signals using $\Omega_1$ have the same PSD as rectangularly-pulsed 2NFSK/2PSK with $\mu=\frac{1}{2}$. Besides, since multi-frequency NQFPM is an embodiment of (N, 2, 1, 2) OMOAM using $\Omega_2$, all OMOAM signals using $\Omega_2$ have the same PSD as NQFPM. Quoting "quadrature frequency . . . ", eqs. 25 and 26, Fleisher, for the PSD's of rectangular-pulsed 2NFSK/2PSK with $\mu=\frac{1}{2}$ and NQFPM, the equivalent lowpass PSD's of unit-power OMOAM using $\Omega_1$ and $\Omega_2$ are given by $$S_{LP}(f) = \frac{T}{2N} \sum_{n=0}^{2N-1} \text{sinc}^2\left(fT + \frac{2N-1}{4} - \frac{n}{2}\right), \Omega_1 \tag{43}$$

$$S_{LP}(f) = \frac{T}{N} \sum_{n=0}^{N-1} \text{sinc}^2\left(fT + \frac{N-1}{2} - n\right), \Omega_2 \tag{44}$$

wih $\text{sinc}(x) \triangleq \sin(\pi x)/(\pi x)$. Next, by taking the Fourier transforms of $h_n(t)$'s in $\Omega_3(N_p)$ and $\Omega_4(N_p)$ and substituting the results into (42), the equivalent lowpass PSD's of unit-power OMOAM using $\Omega_3(N_p)$ and $\Omega_4(N_p)$ are obtained as $$S_{LP} = \frac{T}{N} \sum_{m=0}^{N_p-1} \sum_{m=0}^{N/N_p-1} \left[ \begin{array}{c} \text{sinc}^2\left(fT - N_p\left(2m - \frac{N}{2N_p} + 1\right) - \left(n + \frac{1}{2}\right)\right) + \\ \text{sinc}^2\left(fT - N_p\left(2m - \frac{N}{2N_p} + 1\right) + \left(n + \frac{1}{2}\right)\right) \end{array} \right] \tag{45}$$

$$= \frac{T}{N} \sum_{n=0}^{N-1} \text{sinc}^2\left(fT + \frac{N-1}{2} - n\right), \Omega_3(N_p) \tag{46}$$

$$S_{LP} = \frac{T}{2N} \sum_{m=0}^{N_p-1} \sum_{m=0}^{N/N_p-1} \left[ \begin{array}{c} \text{sinc}\left(fT - N_p\left(2m - \frac{N}{N_p} + 1\right) - \left(n + \frac{1}{2}\right)\right) + \\ \text{sinc}\left(fT - N_p\left(2m - \frac{N}{N_p} + 1\right) + \left(n + \frac{1}{2}\right)\right) \end{array} \right], \tag{47}$$

$$\Omega_4(N_p)$$

in which (46) is obtained from (45) by simply reordering the dummy variables m and n in the double sum of (45). Note that OMOAM using $\Omega_2$ gives the same PSD as OMOAM using $\Omega_3$ for any $N_p$. It can also be observed from (47) that (N,M,L,K) OMOAM using $\Omega_4$ exhibits the same PSD as the continuous-phase NQFPM.

Similarly, the equivalent lowpass PSD of unit-power OMOAM using $\Omega_5$ is given by $$S_{LP} = \frac{1}{2N} \sum_{n=0}^{N-1} G_b^2\left(f + \frac{1}{2}(N-1-2n)\Delta f\right), \Omega_5 \tag{48}$$

If the root raised cosine spectrum is used and $\Delta f=(1+\alpha)/T$, the bandwidth that the total power is captured by OMOAM using root-raised-cosine pulsed $\Omega_5$ is given by $$B_0 = N\frac{1+\alpha}{T} = \frac{N_c(1+\alpha)}{2(L\log_2 K + \log_2(N_c/L))T_b} \quad (49)$$

The result with $\alpha=0$ corresponds to OMOAM using ideal Nyquist-pulsed $\Omega_5$.

Spectral Performance Trends: A useful evaluation of spectral compactness is provided by the fractional out-of-band power containment, $$\eta = 10\log_{10}\left(1 - \int_{-B/2}^{B/2} S_{LP}(f)df\right) \quad (50)$$

which denotes the fraction of total power that is not captured within the frequency band $[-B/2,B/2]$. In what follows, the spectral trends on $\eta$ for various OMOAM signals are studied with respect to the normalized bandwidth $BT_b$ so that the spectral efficiency can be compared among different signals with the same data bit rate. Here, the spectral efficiency is referred to as the inverse of $BT_b$ that is required to achieve a given $\eta$. Therefore, to achieve a fixed $\eta$, the signal requiring a smaller $BT_b$ can exhibit higher spectral efficiency.

Figure 5:
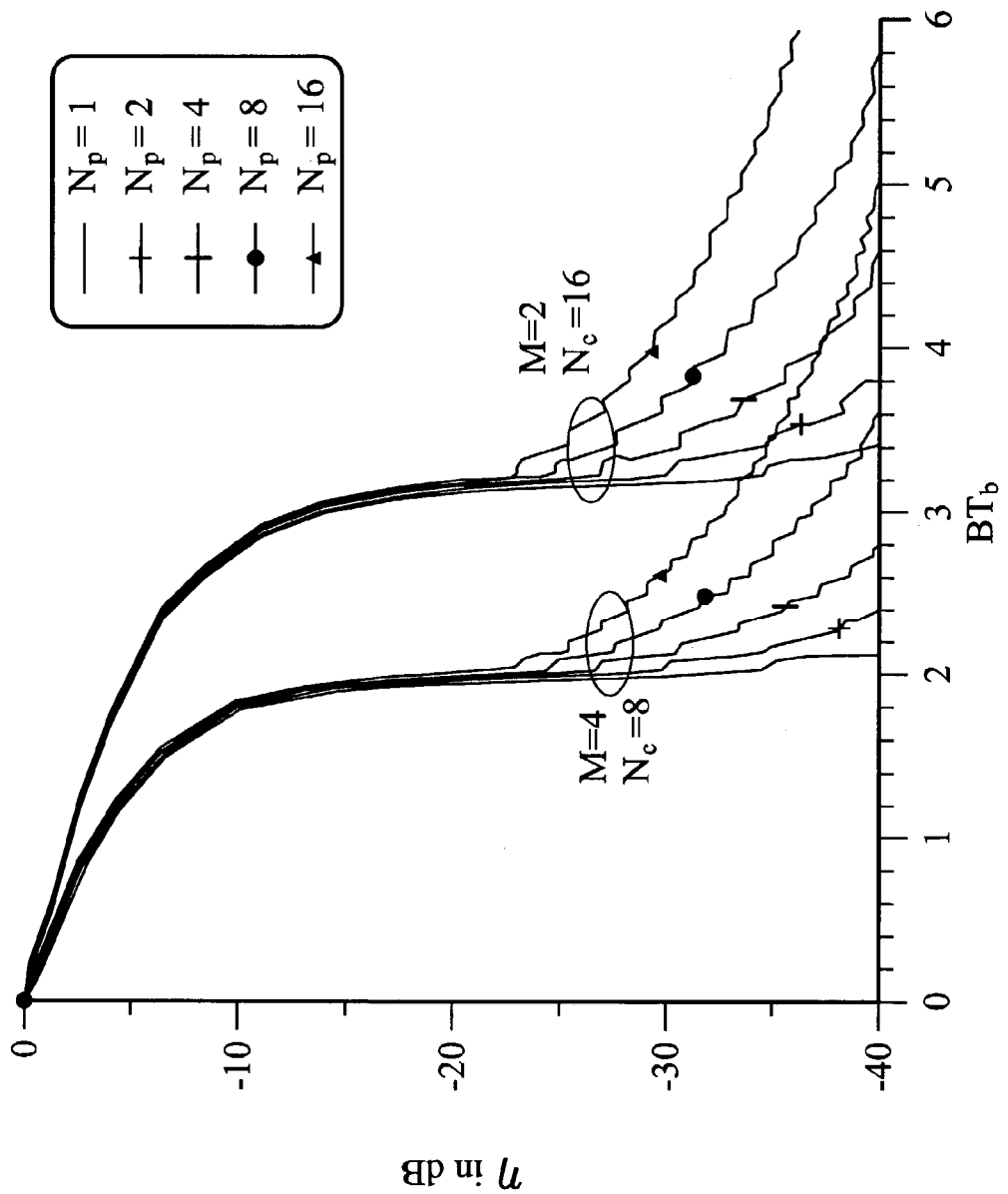
FIG. 5 shows a comparison the spectral efficiency of OMBM using $\Omega_4(N_p)$ with $N_p$ varied.

FIG. 5 compares the spectral efficiency of OMBM using $\Omega_4(N_p)$ with $N_p$ varied. As indicated, the signals using $\Omega_4(N_p)$ provide approximately the same spectral efficiency for all $N_p$ when less power is required to be captured within $[-B/2,B/2]$ (or, when the required $\eta$ is large). When the required $\eta$ is extremely small, the signal with a smaller $N_p$ yields preferably higher efficiency. In this regard, the basis set $\Omega_4$ is the most prevailing for use. As an embodiment of (N,2,1) OMBM using $\Omega_4(1)$, the classical sinusoidally-pulsed (or continuous-phase) NQFPM signal is confirmed here to provide the most prevailing spectral efficiency out of the (N,2,L) OMBM signals using $\Omega_4(N_p)$.

Figure 6:
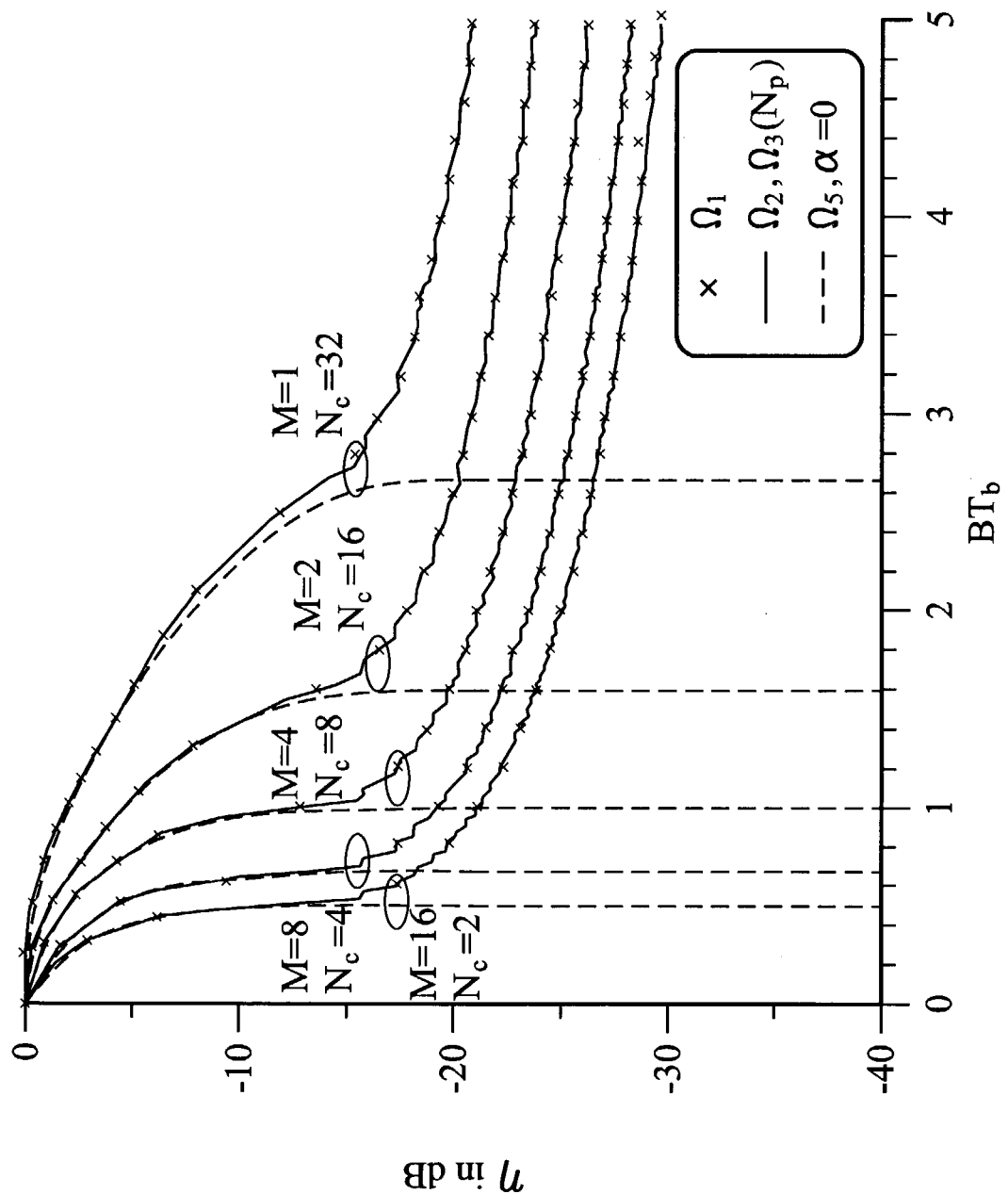
FIGS. 6 and 7 illustrate several spectral trends on the (N,M,L) OMBM signals with M varied but N fixed.
Figure 7:
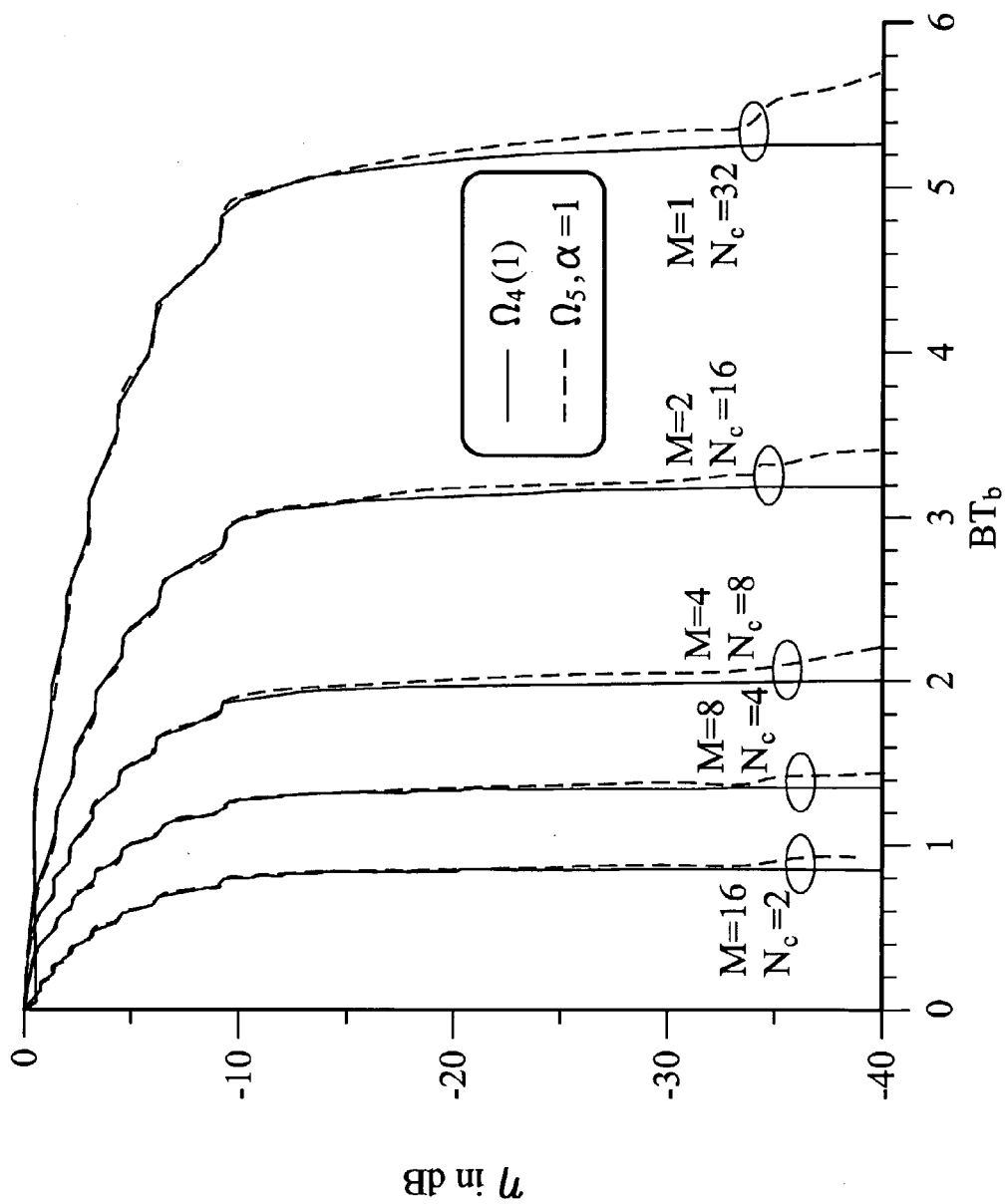

FIGS. 6 and 7 illustrate several spectral trends on the (N,M,L) OMBM signals with M varied but N fixed, which require approximately the same order of complexity in hardware implementation. As shown by both figures in conjunction with FIG. 4b, all the OMBM schemes with the same N exhibit higher spectral efficiency as M is increased, while yielding worse error performance since $N_c$ is decreased accordingly. The spectral trend results because more data bits per T seconds of OMBM transmission is carried as M is increased. It is also shown in FIG. 6 that when N is large (N,M,L) OMBM using $\Omega_1$ provides almost the same spectral efficiency as (N,M,L) OMBM using $\Omega_2$ or $\Omega_3(N_p)$ with any $N_p$. Moreover, their spectral efficiencies are close to (N,M,L) OMBM using the ideal Nyquist-pulsed $\Omega_5$ with $\alpha=0$ and $\Delta f=1/T$ when the required $\eta$ is large. In FIG. 7, (N,M,L) OMBM using $\Omega_4(1)$ is also found to provide the spectral efficiency approaching to that of (N,M,L) OMBM using root raised cosine pulsed $\Omega_5$ with $\alpha=1$ and $\Delta f=2/T$, even when the required $\eta$ is extremely small. These trends also hold for other (N,M,L,K) OMOAM signals with M varied but N, L and K fixed.

Figure 8:
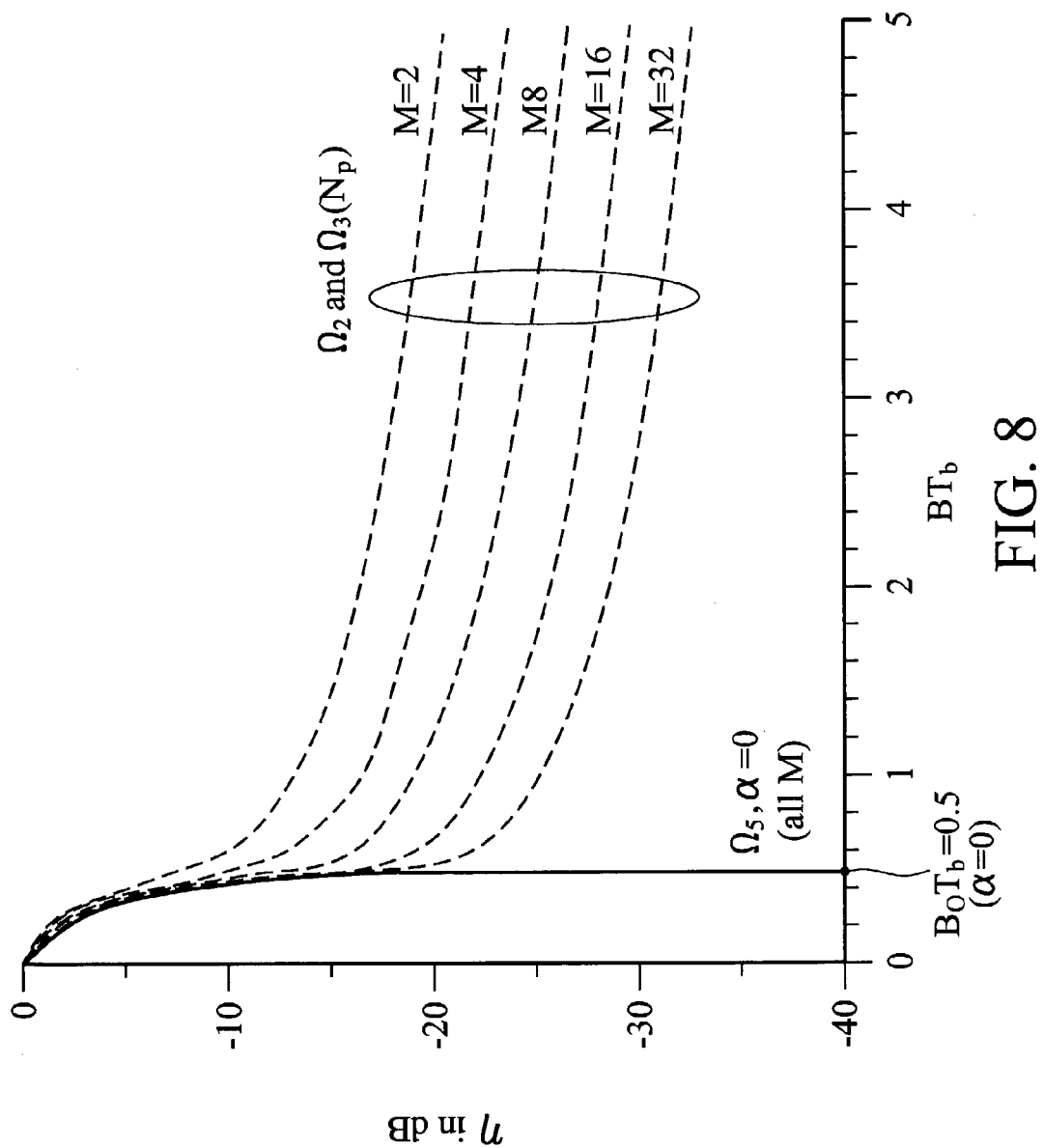
FIGS. 8 and 9 illustrate the spectral trends on various OMBM signals with $N_c$ fixed.
Figure 9:
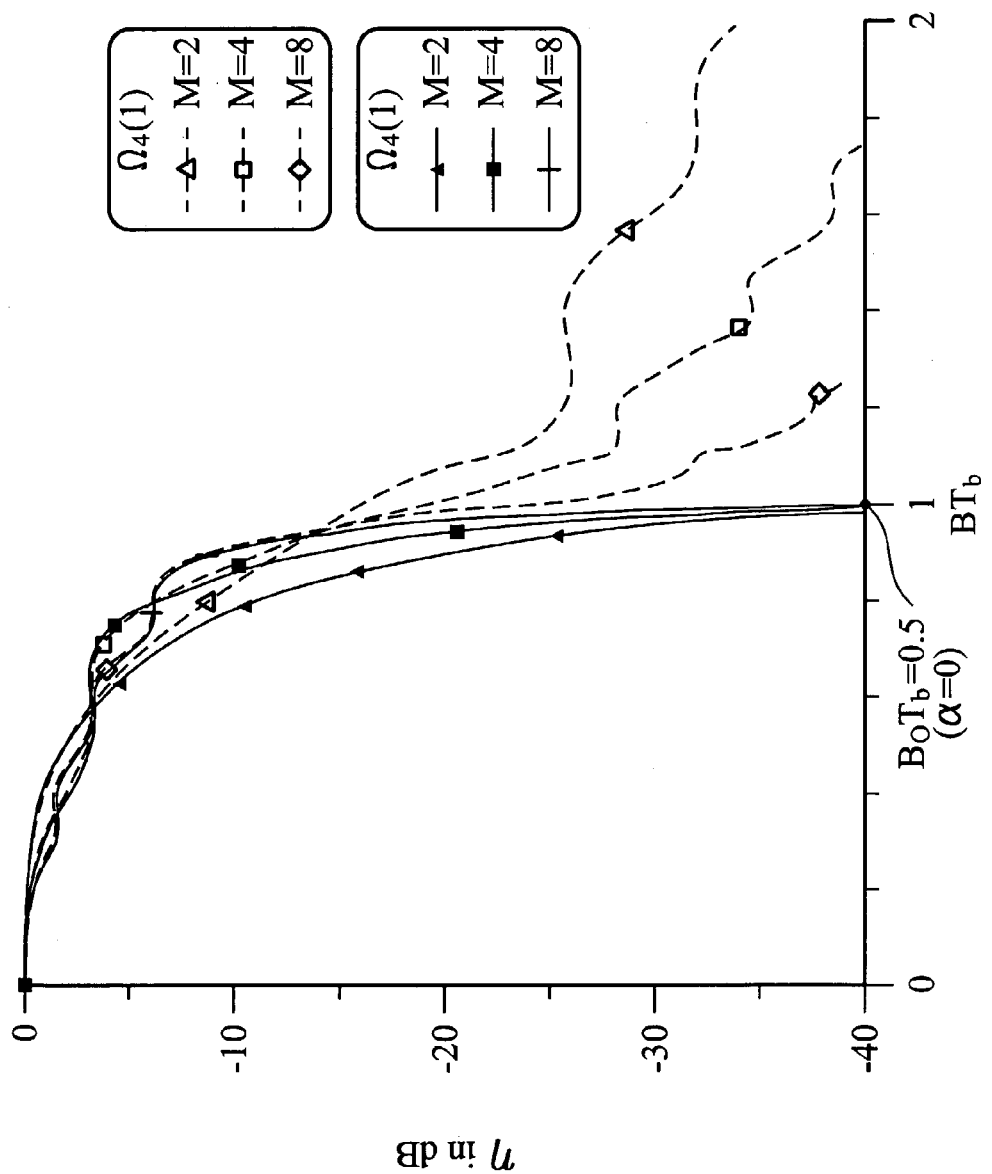

FIG. 8 and FIG. 9 illustrate the spectral trends on various OMBM signals with $N_c$ fixed, which are known to provide essentially the same BEP characteristic. The basis sets considered are assumed to contain 2M basis signals (i.e., N=M) and the set size varies commensurately with the number of orthogonal multiplexing levels. In both figures, the total-power bandwidths $B_0 T_b$ for the band-limited OMBM signals using $\Omega_5$ are also denoted to serve as a reference of compactness. As shown in FIG. 8, the signals using $\Omega_2$ and $\Omega_3(N_p)$ exhibit higher spectral efficiency when M is increased, or equivalently when N is increased. Also in FIG. 9, the spectral efficiency of OMBM using $\Omega_4(1)$ is shown to improve with M increased when the required $\eta$ is small. It is also found in FIG. 8 that the approaching of the spectral efficiency of time-limited OMBM using $\Omega_2$ (or $\Omega_3(N_p)$ for any $N_p$) to that of band-limited OMBM using the ideal Nyquist-pulsed $\Omega_5$ with $\alpha=0$ and $\Delta f=1/T$ extends over a wider range of required $\eta$ when M is increased. As also demonstrated in FIG. 9, the spectral efficiency of time-limited OMBM using $\Omega_4(1)$ approaches closer to that of band-limited OMBM using $\Omega_5$ with $\alpha=1$ and $\Delta f=2/T$ when a larger M is used. Moreover, very high spectral efficiency can be obtained by the signals using $\Omega_4(1)$ with a large M even when an extremely small $\eta$ is required to achieve. By comparing FIGS. 8 and 9, it is also found that (M,M,L) OMBM using $\Omega_2$ (or $\Omega_3(N_p)$) is more spectrally efficient than (M,M,L) OMBM using $\Omega_4(1)$ when the required $\eta$ is large, but the trend is reversed when the required $\eta$ is small. As was noted, the above performance trends associated with OMBM using $\Omega_2$ also exist with OMBM using $\Omega_1$. Moreover, all the demonstrated trends also exist with other (N,M,L,K) OMOAM signals with $N_c$, L and K fixed, but N and M varied commensurately.

This method introduces new modulations which can provide a vast choice of power and spectral efficiencies ranging among classical results. The BEP characteristics of coherent optimum OMOAM schemes are found to depend on the modulation parameters $N_c$, L and K, but are irrelevant to the specific form of the basis set and the associated basis signal assignment. On the other hand, the spectral analysis shows that the power spectrum shape of the OMOAM signal is determined solely by the basis set, without regard to modulation parameters nor the basis signal assignment. The modulation parameters N, M, L and K are related to the spectrum efficiency only through the influence of the data rate. These properties imply that, when practically designing an OMOAM system, the basis set and the modulation parameters can be disjointedly chosen to achieve the required spectral and power efficiencies. Further, by adjusting the basis signal assignment, many equivalent modulation formats can be found to achieve the same power and spectral efficiencies.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. An orthogonally-multiplexed orthogonal amplitude modulation method, comprising the steps of:
    generating 2N-dimensional basis signals, all the 2N-dimensional basis signals and their time-shift signals being mutually orthogonal;
    partitioning the 2N-dimensional basis signals into M basis signals subsets;
    generating M supersymbols corresponding to the M basis signals subsets at a signal time, each supersymbol having L+1 symbols consisting of 1 orthogonal symbol and L amplitude symbols, wherein each amplitude symbol having K amplitude levels;

selecting L basis signals out of each one of the M basis signals subsets according to each corresponding supersymbol of the M supersymbols at the signal time;

modulating each supersymbol of the M supersymbols with the corresponding L basis signals to form M component signals; and multiplexing the M component signals to form an orthogonally-muhiplexed orthogonal amplitude modulation signal;

wherein N, M, L, and K are positive integers.

2. The orthogonally-multiplexed orthogonal amplitude modulation method as claimed in claim 1 wherein each one of the M component signals has a dimensionality of $N_c=2N/M$ and N, M, L, K and $N_c$ are all integer power of two.

3. The orthogonally-multiplexed orthogonal amplitude modulation method as claimed in claim 1 wherein the orthogonal symbol is $N_c/L$-ary symbol.

4. The orthogonally-multiplexed orthogonal amplitude modulation method as claimed in claim 1 wherein the amplitude symbols is LK-ary symbols.

5. The orthogonally-multiplexed orthogonal amplitude modulation method as claimed in claim 1 wherein $L \geq 4$.

6. The orthogonally-multiplexed orthogonal amplitude modulation method as claimed in claim 1 wherein $N_c/L>1$ and $K \geq 4$.

7. The orthogonally-multiplexed orthogonal amplitude modulation method as claimed in claim 1 wherein N is given the constraints $1 \leq M \leq 2N$, $1 \leq N_c \leq 2N$, and $1 \leq L \leq N_c$.

8. The orthogonally-multiplexed orthogonal amplitude modulation method as claimed in claim 1 comprising the demodulation steps of:

generating predictive supersymbol at the signal time;

modulating the predictive supersymbol with the L basis signals to form a predictive signal; and choosing the predictive supersymbols to minimize a mean-square-error of the predictive signal and a actual received signal.

9. The orthogonally-multiplexed orthogonal amplitude modulation method as claimed in claim 1 comprising the demodulation steps of:

generating predictive supersymbol at the signal time;

generating L correlation measurements according to a actual received signal and the 2N-dimension basis signals at the signal time; and choosing one of the predictive supersymbols to maximize a difference between the inner-product of the amplitude symbols and the L correlation measurements and the self inner-product of the amplitude symbols.

10. An orthogonally-multiplexed orthogonal amplitude modulation device, comprising:

M orthogonal basis signal sources, generating 2N-dimensional basis signals partitioned into M basis signals subsets corresponding to the M orthogonal basis signals; wherein all the 2N-dimensional basis signals and their time-shift signals are mutually orthogonal;

M supersymbol sources, generating M supersyrnbols corresponding to the M basis signals subsets at a signal time, wherein each supersymbol having L+1 symbols consisting of 1 orthogonal symbol and L amplitude symbols, each amplitude symbol having K amplitude levels;

M modulators, forming M component signals by modulating M supersymbols with M sets of corresponding L basis signals selected out of the M basis signals subsets according to the corresponding supersymbol and at the signal time; and a multiplex, multiplexing the M component signals to form an orthogonally-multiplexed orthogonal amplitude modulation signal;

wherein N, M, L, and K are positive integers.

11. The orthogonally-multiplexed orthogonal amplitude modulation device as claimed in claim 10 wherein each one of the M component signals has a dimensionality of $N_c=2N/M$.

12. The orthogonally-multiplexed orthogonal amplitude modulation device as claimed in claim 10 wherein the orthogonal symbol is $N_c/L$-ary symbol.

13. The orthogonally-multiplexed orthogonal amplitude modulation device as claimed in claim 10 wherem the amplitude symbols is LK-ary symbols.

14. The orthogonally-multiplexed orthogonal amplitude modulation device as claimed in claim 10 wherein $L \geq 4$.

15. The orthogonally-multiplexed orthogonal amplitude modulation device as claimed in claim 10 wherein $N_c/L>1$ and $K \geq 4$.

16. The orthogonally-multiplexed orthogonal amplitude modulation device as claimed in claim 10 wherein N, M, L, K, and $N_c$ are all integer power of two.

17. The orthogonally-multiplexed orthogonal amplitude modulation device as claimed in claim 10 wherein N is given the constraints $1 \leq M \leq 2N$, $1 \leq N_c \leq 2N$, and $1 \leq L \leq N_c$.

18. The orthogonally-multiplexed orthogonal amplitude modulation device as claimed in claim 10 comprising:

a predict device, generating predictive supersymbol at the signal time;

a synthesis device, modulating the supersymbol with the L basis signals to form a predictive signal, and choosing the predictive supersymbol to minimize a mean-square-error of the predictive signal and a actual received signal.

19. The orthogonally-multiplexed orthogonal amplitude modulation device as claimed in claim 10 comprising:

a predict device, generating predictive supersymbol at the signal time;

a correlation measurement device, generating L correlation measurements according to a actual received signal and the 2N-dimension basis signals at the signal time; and a synthesis device, choosing the predictive supersymbol to maximize a difference between the inner-product of the amplitude symbols and the L correlation measurements and the self inner-product of the amplitude symbols.

* * * * *